United States Patent
Saggar et al.

(10) Patent No.: US 12,004,168 B2
(45) Date of Patent: Jun. 4, 2024

(54) FREQUENCY HOPPING FOR CONTROL INFORMATION IN DOWNLINK SHARED CHANNEL

(71) Applicant: QUALCOMM Incorporated, San Diego, CA (US)

(72) Inventors: Hemant Saggar, Irvine, CA (US); Iyab Issam Sakhnini, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/206,655

(22) Filed: Mar. 19, 2021

(65) Prior Publication Data

US 2022/0303958 A1    Sep. 22, 2022

(51) Int. Cl.
*H04B 1/713* (2011.01)
*H04W 72/23* (2023.01)
*H04W 72/0453* (2023.01)

(52) U.S. Cl.
CPC ............ *H04W 72/23* (2023.01); *H04B 1/713* (2013.01); *H04W 72/0453* (2013.01)

(58) Field of Classification Search
CPC ... H04L 5/0012; H04L 5/0044; H04L 5/0053; H04L 5/0092; H04W 4/70; H04W 72/0406; H04W 72/042; H04W 72/0453; H04B 1/713

See application file for complete search history.

(56) References Cited

U.S. PATENT DOCUMENTS

| 4,872,205 | A | * | 10/1989 | Smith | H04B 1/7156 455/527 |
| 5,394,433 | A | * | 2/1995 | Bantz | H04B 1/713 375/132 |
| 10,757,690 | B2 | | 8/2020 | Sun et al. | |
| 11,653,358 | B2 | | 5/2023 | Gurelli | |
| 11,683,127 | B2 | | 6/2023 | Park | |
| 2015/0223243 | A1 | * | 8/2015 | Tabet | H04L 5/0073 370/330 |
| 2016/0233989 | A1 | * | 8/2016 | Belghoul | H04W 76/15 |
| 2018/0006779 | A1 | * | 1/2018 | Yi | H04L 5/0044 |
| 2018/0324768 | A1 | * | 11/2018 | Shaheen | H04W 72/042 |
| 2021/0345387 | A1 | | 11/2021 | Gurelli | |
| 2023/0232418 | A1 | | 7/2023 | Xue et al. | |

* cited by examiner

*Primary Examiner* — Dady Chery
(74) *Attorney, Agent, or Firm* — QUALCOMM Incorporated

(57) ABSTRACT

Methods, systems, and devices for wireless communications are described. A user equipment (UE) may receive at least one control message including an indication that frequency hopping for downlink control information (DCI) is activated for physical downlink shared channel (PDSCH). The UE may determine a frequency hopping configuration (e.g., a frequency hopping pattern) for the DCI, which may be applied for PDSCH occasions, for a group of PDSCH occasions, or until changed by another indication from the network. The UE may also receive a downlink reference according to the frequency hopping configuration. For example, if intra-occasion frequency hopping is activated, demodulation reference signals (DMRS) may be received in each hop of the DCI within a PDSCH occasion, and if inter-occasion frequency hopping is activated, DMRS may be received once per PDSCH occasion.

30 Claims, 18 Drawing Sheets

FREQUENCY HOPPING FOR CONTROL INFORMATION IN DOWNLINK SHARED CHANNEL

FIELD OF TECHNOLOGY

The following relates to wireless communications, including frequency hopping for control information in downlink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit downlink control information (DCI) to a user equipment (UE) via a downlink control channel (e.g., a physical downlink control channel (PDCCH)). The DCI may include uplink scheduling grants, which may include resources and transport formats for the UE to use for uplink transmissions (e.g., transmitted via an uplink shared channel, such as a physical uplink shared channel (PUSCH)). However, to receive DCI, the UE may blindly decode PDCCH transmissions. That is, the UE may decode a set of PDCCH candidates to determine whether DCI has been transmitted to the UE. Blind decoding may increase power consumption, which increases as the number of PDCCH candidates for a UE increases.

SUMMARY

The described techniques relate to improved methods, systems, devices, and apparatuses that support frequency hopping for control information in downlink shared channel. Generally, the described techniques provide for frequency hopping for downlink control information (DCI) over a downlink shared channel (e.g., a physical downlink shared channel (PDSCH)). A user equipment (UE) may receive an indication (e.g., as part of a control message) that frequency hopping for DCI is activated. For instance, DCI may be transmitted on a set of symbols of one or more physical downlink shared channel (PDSCH) occasions. The set of symbols may hop (i.e., change) between or across multiple frequency locations; for example, the frequency locations may change within a single PDSCH occasion (e.g., intra-occasion frequency hopping) or may change across multiple PDSCH occasions (e.g., inter-occasion frequency hopping). The UE may determine a frequency hopping configuration or a frequency hopping pattern for the DCI (e.g., such that the pattern is applied for one or more of the PDSCH occasions), and may monitor the set of symbols according to the frequency hopping pattern. In some cases, the UE may also monitor each hop for a downlink reference signal (e.g., a demodulation reference signal (DMRS)) and may perform channel estimation for the one or more PDSCH occasions based on the downlink reference signal.

A method for wireless communications at a UE is described. The method may include receiving a control message that indicates frequency hopping is activated for DCI in one or more downlink shared channel occasions for the UE, determining a frequency hopping configuration for DCI over a set of symbols of the one or more downlink shared channel occasions based on the control message, and monitoring the set of symbols of the one or more downlink shared channel occasions for the DCI in accordance with the frequency hopping configuration.

An apparatus for wireless communications at a UE is described. The apparatus may include a processor, memory coupled with the processor, and instructions stored in the memory. The instructions may be executable by the processor to cause the apparatus to receive a control message that indicates frequency hopping is activated for DCI in one or more downlink shared channel occasions for the UE, determine a frequency hopping configuration for DCI over a set of symbols of the one or more downlink shared channel occasions based on the control message, and monitor the set of symbols of the one or more downlink shared channel occasions for the DCI in accordance with the frequency hopping configuration.

Another apparatus for wireless communications at a UE is described. The apparatus may include means for receiving a control message that indicates frequency hopping is activated for DCI in one or more downlink shared channel occasions for the UE, means for determining a frequency hopping configuration for DCI over a set of symbols of the one or more downlink shared channel occasions based on the control message, and means for monitoring the set of symbols of the one or more downlink shared channel occasions for the DCI in accordance with the frequency hopping configuration.

A non-transitory computer-readable medium storing code for wireless communications at a UE is described. The code may include instructions executable by a processor to receive a control message that indicates frequency hopping is activated for DCI in one or more downlink shared channel occasions for the UE, determine a frequency hopping configuration for DCI over a set of symbols of the one or more downlink shared channel occasions based on the control message, and monitor the set of symbols of the one or more downlink shared channel occasions for the DCI in accordance with the frequency hopping configuration.

In some examples of the method, apparatuses, and non-transitory computer-readable medium described herein, determining the frequency hopping configuration may include operations, features, means, or instructions for determining a frequency hopping pattern for the DCI over the set of symbols within a single downlink shared channel occasion.

Some examples of the method, apparatuses, and non-transitory computer-readable medium described herein may further include operations, features, means, or instructions for receiving a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

Some examples of the method, apparatuses, and non-transitory computer-readable medium described herein may further include operations, features, means, or instructions for receiving a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

Some examples of the method, apparatuses, and non-transitory computer-readable medium described herein may further include operations, features, means, or instructions for determining a respective time duration for each hop of a set of frequency hops indicated by the frequency hopping configuration, the respective time durations based on a length of the DCI.

Some examples of the method, apparatuses, and non-transitory computer-readable medium described herein may further include operations, features, means, or instructions for determining a number of frequency locations across multiple downlink shared channel occasions of the one or more downlink shared channel occasions indicated by the frequency hopping configuration, where the set of symbols span the number of frequency locations.

Some examples of the method, apparatuses, and non-transitory computer-readable medium described herein may further include operations, features, means, or instructions for receiving, from a base station, an indication of a frequency hopping pattern of the frequency hopping configuration for the one or more downlink shared channel occasions, the frequency hopping pattern for each of the one or more downlink shared channel occasions or a subset of the one or more downlink shared channel occasions.

Some examples of the method, apparatuses, and non-transitory computer-readable medium described herein may further include operations, features, means, or instructions for receiving, from a base station, an indication of a frequency hopping pattern of the frequency hopping configuration for the one or more downlink shared channel occasions and determining, based on the frequency hopping pattern, a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a bandwidth part (BWP) allocation of the one or more downlink shared channel occasions, where the monitoring may be based on the sequence of offsets.

Some examples of the method, apparatuses, and non-transitory computer-readable medium described herein may further include operations, features, means, or instructions for receiving, from a base station, an indication of a frequency hopping pattern of the frequency hopping configuration for the one or more downlink shared channel occasions and determining, based on the frequency hopping pattern, an index corresponding to a set of starting resource blocks of the set of symbols of the one or more downlink shared channel occasions, where the monitoring may be based on the set of starting resource blocks.

Some examples of the method, apparatuses, and non-transitory computer-readable medium described herein may further include operations, features, means, or instructions for receiving, from a base station, an indication of a frequency hopping pattern of the frequency hopping configuration for the one or more downlink shared channel occasions and determining, based on the frequency hopping pattern, a hopping step, a sequence of hopping steps, or a set of frequency locations for the set of symbols of the one or more downlink shared channel occasions, where the monitoring may be based on the hopping step, the sequence of hopping steps, or the set of frequency locations.

In some examples of the method, apparatuses, and non-transitory computer-readable medium described herein, the set of frequency locations may be based on a resource index of a synchronization signal of a reference signal associated with the one or more downlink shared channel occasions, or a system frame number associated with at least one of the one or more downlink shared channel occasions.

Some examples of the method, apparatuses, and non-transitory computer-readable medium described herein may further include operations, features, means, or instructions for monitoring each hop of a set of hops of the DCI over the set of symbols within a downlink shared channel occasion of the one or more downlink shared channel occasions for a downlink reference signal and performing channel estimation for the downlink shared channel occasion based on the downlink reference signal.

Some examples of the method, apparatuses, and non-transitory computer-readable medium described herein may further include operations, features, means, or instructions for monitoring each hop of a set of hops of the DCI over the set of symbols across multiple downlink shared channel occasions of the one or more downlink shared channel occasions for one or more downlink reference signals and performing channel estimation for the multiple downlink shared channel occasions based on the one or more downlink reference signals.

Some examples of the method, apparatuses, and non-transitory computer-readable medium described herein may further include operations, features, means, or instructions for receiving a second control message that deactivates frequency hopping for DCI in at least one of the one or more downlink shared channel occasions.

In some examples of the method, apparatuses, and non-transitory computer-readable medium described herein, the control message includes a radio resource control RRC message, a MAC-CE, or a DCI message.

In some examples of the method, apparatuses, and non-transitory computer-readable medium described herein, the set of symbols may be within a same downlink shared channel occasion of the one or more downlink shared channel occasions.

In some examples of the method, apparatuses, and non-transitory computer-readable medium described herein, the set of symbols may be within two or more downlink shared channel occasions of the one or more downlink shared channel occasions.

A method for wireless communications at a base station is described. The method may include transmitting, to a UE, a control message that indicates frequency hopping is activated for DCI in one or more downlink shared channel occasions for the UE, determining a frequency hopping configuration for DCI over a set of symbols of the one or more downlink shared channel occasions based on the control message, and transmitting DCI using the set of symbols of the one or more downlink shared channel occasions in accordance with the frequency hopping configuration.

An apparatus for wireless communications at a base station is described. The apparatus may include a processor, memory coupled with the processor, and instructions stored in the memory. The instructions may be executable by the processor to cause the apparatus to transmit, to a UE, a control message that indicates frequency hopping is activated for DCI in one or more downlink shared channel occasions for the UE, determine a frequency hopping configuration for DCI over a set of symbols of the one or more downlink shared channel occasions based on the control message, and transmit DCI using the set of symbols of the one or more downlink shared channel occasions in accordance with the frequency hopping configuration.

Another apparatus for wireless communications at a base station is described. The apparatus may include means for transmitting, to a UE, a control message that indicates frequency hopping is activated for DCI in one or more downlink shared channel occasions for the UE, means for determining a frequency hopping configuration for DCI over a set of symbols of the one or more downlink shared channel occasions based on the control message, and means for transmitting DCI using the set of symbols of the one or more downlink shared channel occasions in accordance with the frequency hopping configuration.

A non-transitory computer-readable medium storing code for wireless communications at a base station is described. The code may include instructions executable by a processor to transmit, to a UE, a control message that indicates frequency hopping is activated for DCI in one or more downlink shared channel occasions for the UE, determine a frequency hopping configuration for DCI over a set of symbols of the one or more downlink shared channel occasions based on the control message, and transmit DCI using the set of symbols of the one or more downlink shared channel occasions in accordance with the frequency hopping configuration.

Some examples of the method, apparatuses, and non-transitory computer-readable medium described herein may further include operations, features, means, or instructions for transmitting a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

Some examples of the method, apparatuses, and non-transitory computer-readable medium described herein may further include operations, features, means, or instructions for transmitting a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

Some examples of the method, apparatuses, and non-transitory computer-readable medium described herein may further include operations, features, means, or instructions for transmitting an indication of a frequency hopping pattern of the frequency hopping configuration for the one or more downlink shared channel occasions, the frequency hopping pattern for each of the one or more downlink shared channel occasions or a subset of the one or more downlink shared channel occasions.

In some examples of the method, apparatuses, and non-transitory computer-readable medium described herein, the frequency hopping pattern indicates a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a BWP allocation of the one or more downlink shared channel occasions.

In some examples of the method, apparatuses, and non-transitory computer-readable medium described herein, the frequency hopping pattern indicates an index corresponding to a set of starting resource blocks of the set of symbols of the one or more downlink shared channel occasions.

In some examples of the method, apparatuses, and non-transitory computer-readable medium described herein, the frequency hopping pattern indicates a hopping step, a sequence of hopping steps, or a set of frequency locations for the set of symbols of the one or more downlink shared channel occasions.

Some examples of the method, apparatuses, and non-transitory computer-readable medium described herein may further include operations, features, means, or instructions for transmitting a second control message that deactivates frequency hopping for DCI in at least one of the one or more downlink shared channel occasions.

Some examples of the method, apparatuses, and non-transitory computer-readable medium described herein may further include operations, features, means, or instructions for transmitting a downlink reference signal in each hop of a set of hops of the DCI over the set of symbols within a downlink shared channel occasion of the one or more downlink shared channel occasions.

Some examples of the method, apparatuses, and non-transitory computer-readable medium described herein may further include operations, features, means, or instructions for transmitting a downlink reference signal in each hop of a set of hops of the DCI over the set of symbols across multiple downlink shared channel occasions of the one or more downlink shared channel occasions.

DETAILED DESCRIPTION

Figure 1:
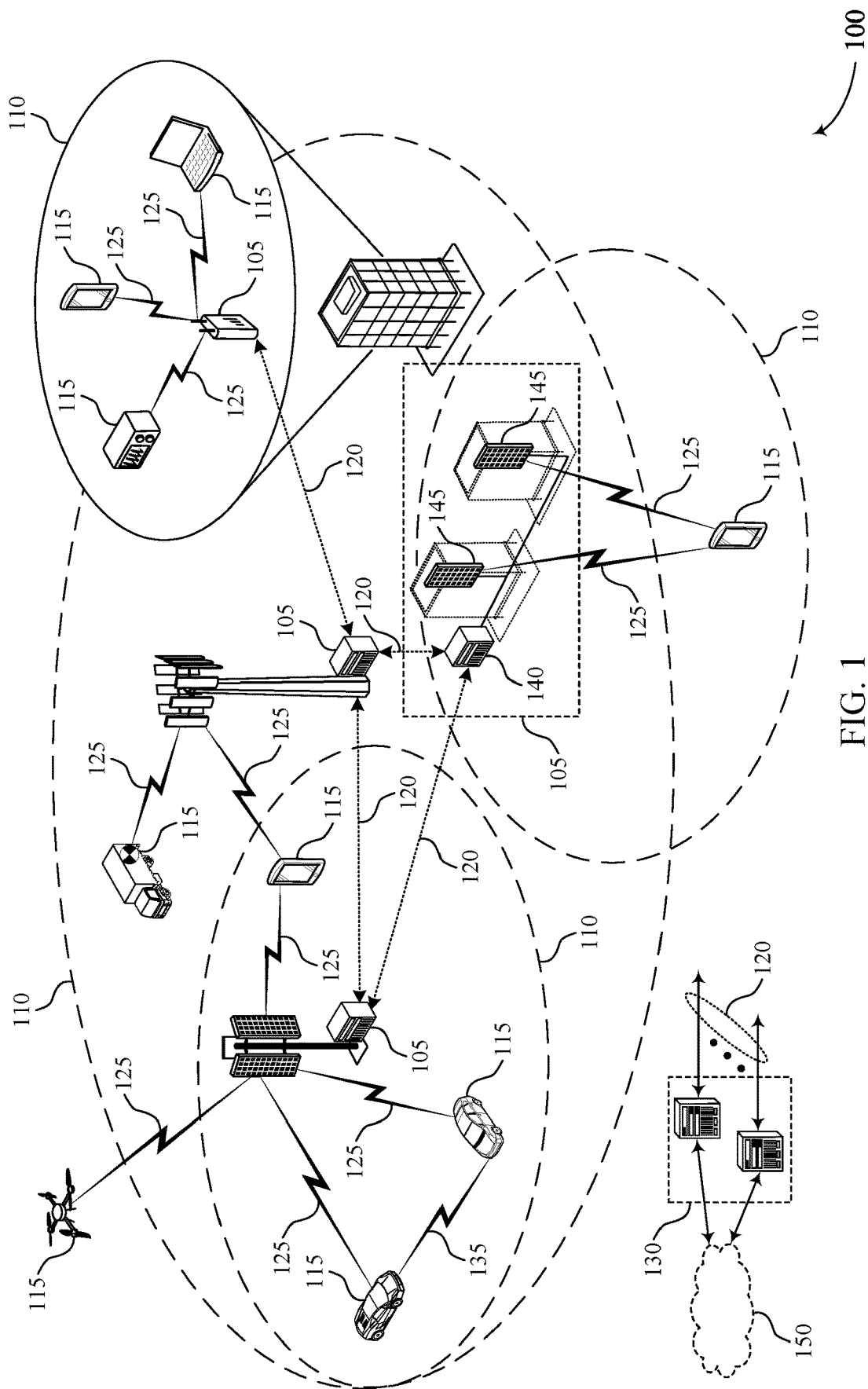
FIGS. 1 and 2 illustrate examples of wireless communications systems that support frequency hopping for control information in downlink shared channel in accordance with aspects of the present disclosure.

In some wireless communications systems, a base station may transmit downlink control information (DCI) to a user equipment (UE) over a downlink control channel, such as a physical downlink control channel (PDCCH). The UE may blindly decode the PDCCH to receive the DCI, which may increase power consumption at the UE. Further, in some cases, DCI transmitted over PDCCH may experience fading or interference, which may result in signal loss. A base station may improve communications reliability and efficiency by transmitting DCI over a set of symbols of a downlink shared control channel occasion (e.g., a physical downlink shared channel (PDSCH) occasion). For example, the base station may leverage higher beamforming gain associated with PDSCH transmissions to overcome signal loss. Additionally, transmitting DCI over PDSCH may result in decreased overhead and reduced blind decoding processes (e.g., thereby reducing UE power consumption), as the UE may receive an indication of the location of the DCI in a PDSCH transmission. In some cases, the base station may configure a set of semi-persistent scheduling (SPS) occasions for PDSCH transmissions. In such cases, the UE may receive DCI periodically (e.g., as part of SPS transmissions), which may reduce the number of blind decoding procedures performed by the UE. In some examples, transmitting DCI over PDSCH may also reduce signaling overhead, which may be useful for reduced capability (Redcap) devices (e.g., surveillance cameras, industrial wireless sensors, smart watches, medical wearables, etc.).

According to the techniques described herein, the base station may reduce or mitigate effects of signal loss (e.g., deep fading, interference, etc.) by changing the frequencies of the set of symbols over which the DCI is transmitted in the downlink shared channel occasion (e.g., the PDSCH occasion). For example, the base station may activate frequency hopping for DCI in one or more PDSCH occasions, where one or more symbols of the set of symbols hops (e.g., changes) frequencies within a single PDSCH occasion (e.g., intra-occasion frequency hopping) or across multiple PDSCH occasions (e.g., inter-occasion frequency hopping). The base station may transmit a control message (e.g., DCI, a medium access control element (MAC-CE), radio resource control (RRC) signaling, or the like) that includes an indication that frequency hopping is activated for subsequent DCI to be transmitted in one or more PDSCH occasions. The UE may determine a frequency hopping configuration or frequency hopping pattern for the DCI over the set of symbols. In some examples, the base station may transmit an indication (e.g., as part of the same or a different control message) of the frequency hopping configuration and/or frequency hopping pattern.

The UE may monitor the set of symbols of the respective one or more PDSCH occasions for the DCI based on the frequency hopping configuration. In some examples, the base station may also transmit one or more downlink reference signals (e.g., demodulation reference signals (DMRSs)) in each PDSCH occasion. For instance, the base station may transmit a DMRS in each hop of the DCI, such that the UE may perform channel estimation for the PDSCH occasion as the frequencies vary across hops.

Aspects of the disclosure are initially described in the context of wireless communications systems. Aspects of the disclosure are then described in the context of frequency hopping procedures and process flows. Aspects of the disclosure are further illustrated by and described with reference to apparatus diagrams, system diagrams, and flowcharts that relate to frequency hopping for control information in downlink shared channel.

FIG. 1 illustrates an example of a wireless communications system 100 that supports frequency hopping for control information in downlink shared channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may communicate with a UE 115 over a downlink control channel (e.g., a PDCCH). For example, the base station 105 may transmit DCI during PDCCH occasions. The UE 115 may blindly decode PDCCH candidates while monitoring the PDCCH occasion, for instance, according to a configured search space. In some examples, the base station 105 may instead transmit DCI over a downlink shared channel (e.g., PDSCH) during a downlink shared channel occasion (e.g., a PDSCH occasion). In such examples, the base station 105 may allocate resources (e.g., time resources, frequency resources) within the PDSCH occasion for the DCI. The base station 105 may indicate, to the UE 115, the location (e.g., the resources) or the contents of the DCI. For instance, the base station 105 may include an indication in DCI transmitted over a control channel (e.g., PDCCH) prior to the DCI that is to be transmitted over the PDSCH. In some examples, the base station 105 may instead include the indication as part of RRC signaling, a MAC-CE, or other control messages.

The techniques described herein support a base station 105 activating frequency hopping for DCI over PDSCH. The base station 105 may indicate (e.g., via a control message, such as a DCI transmitted over a control channel, an RRC message, a MAC-CE, or the like), to the UE 115, that frequency hopping is activated for the DCI over PDSCH, and the UE 115 may determine a frequency hopping configuration based on the indication. The frequency hopping configuration may indicate frequency hopping information, such as hopping step information, frequency location information, frequency hopping pattern information, or the like. For example, the DCI may be transmitted over a set of PDSCH resources (e.g., a set of symbols) of at least one PDSCH occasion, and the frequency hopping information may include a time duration for each hop of a set of frequency hops. That is, the frequency locations for one or more symbols of the set of symbols may change within a single PDSCH occasion (e.g., intra-occasion frequency hopping) according to the time duration of each hop. Additionally, or alternatively, the frequency locations for the one or more symbols may change across multiple PDSCH occasions (e.g., inter-occasion frequency hopping). In any case, the UE 115 may determine the frequency hopping configuration based on the frequency hopping information, such that the UE 115 may monitor the set of symbols for the DCI accordingly.

In some cases, the UE 115 may also monitor each hop (e.g., of a set of hops) for a downlink reference signal (e.g., a demodulation reference signal (DMRS)) and may perform channel estimation for the one or more PDSCH occasions based on the downlink reference signal. For instance, for intra-occasion frequency hopping (e.g., where the set of symbols changes frequencies within a PDSCH occasion), the UE 115 may monitor each hop for a DMRS. In other words, each symbol carrying DCI may also carry DMRS.

Thus, the UE 115 may account for variations in frequency when performing channel estimation. For inter-occasion frequency hopping (e.g., where the set of symbols changes frequencies across multiple PDSCH occasions), the UE 115 may monitor each hop for DMRS such that the UE 115 may receive respective DMRS for each PDSCH occasion. That is, each hop may span multiple DCI symbols, but the UE 115 may only monitor for one DMRS (e.g., and not a DMRS for each DCI symbol, as in intra-occasion frequency hopping).

Figure 2:
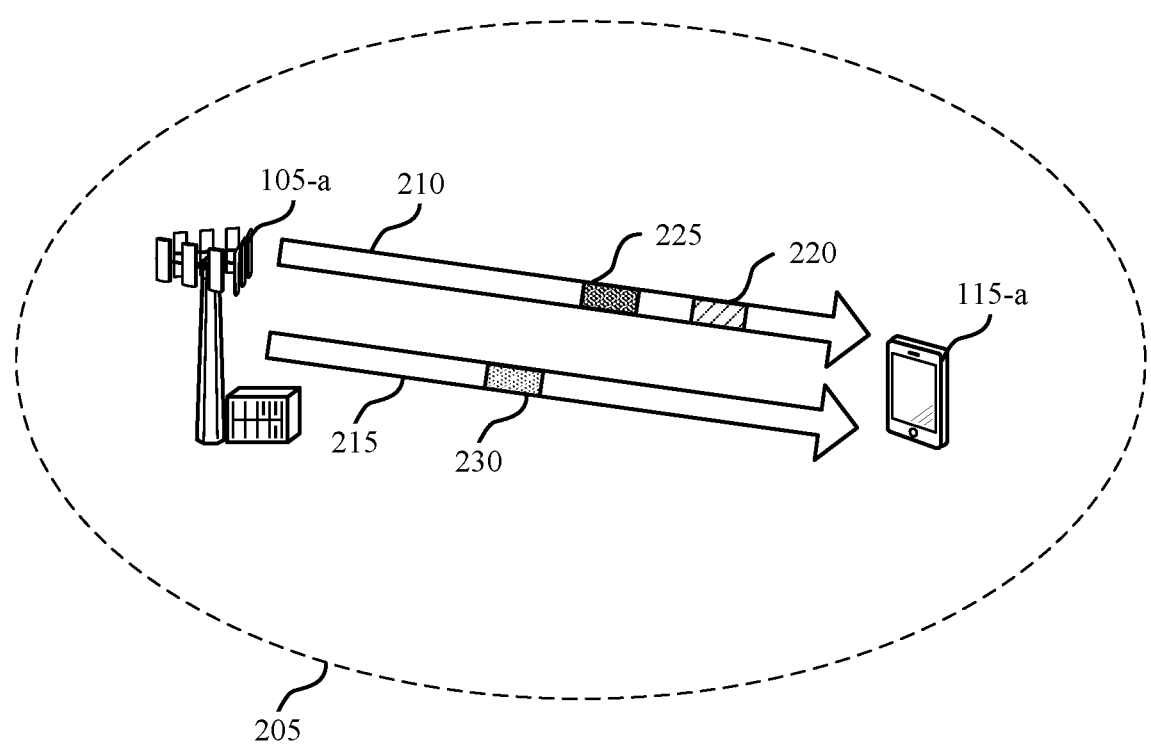

FIG. 2 illustrates an example of a wireless communications system 200 that supports frequency hopping for control information in downlink shared channel in accordance with aspects of the present disclosure. The wireless communications system 200 may include a base station 105-a and UE 115-a, which may be examples of a base station 105 and a UE 115 as described with reference to FIG. 1. The base station 105-a may serve a geographic coverage area 205. The base station 105-a may communicate with the UE 115-a over a communication link 210 and a communication link 215. For instance, the communication link 210 may be an example of a downlink control channel (e.g., a PDCCH) and the communication link 215 may be an example of a downlink shared channel (e.g., a PDSCH).

The base station 105-a may transmit DCI to UE 115-a via PDCCH (e.g., via the communication link 210), for example, to indicate scheduling information or other control information. Coded and modulated DCI bits may be mapped onto a structure based on control channel elements (CCEs) and resource element groups (REGs), where one REG may correspond to 12 subcarriers in frequency and one OFDM symbol in time. One CCE may correspond to 6 REGs. The base station 105-a may include, as part of the DCI, downlink scheduling assignments for the UE 115-a. The downlink scheduling assignments may include information to enable the UE 115-a to properly receive, demodulate, and decode downlink messages on a shared channel (e.g., a PDSCH, such as communication link 215). Additionally or alternatively, the DCI may include uplink scheduling grants, which may include resources and transport formats for the UE 115-a to use for uplink transmissions (e.g., over an uplink shared channel, such as a physical uplink shared channel (PUSCH)). In any case, the base station 105-a may transmit DCI to the UE 115-a according to a DCI format (e.g., Formats 1_1, 1_0, 0_0, 0_1, 2_0, 2_1, 2_2, 2_3, etc.).

To receive the DCI, the UE 115-a may blindly decode PDCCH candidates based on configured search spaces. In some cases, the base station 105-a may improve communications by instead transmitting DCI to the UE 115-a over PDSCH (e.g., communication link 215). For example, a PDSCH may be associated with higher beamforming gains. Additionally, transmitting DCI over PDSCH may result in significant savings in blind decoding since locations of the DCI may be indicated to the UE 115-a (e.g., by the base station 105-a). The base station 105-a may reduce or mitigate effects of signal loss (e.g., deep fading, interference, etc.) by changing frequencies with which the base station 105-a uses to communicate with the UE 115-a. For example, the base station 105-a may use frequency hopping when transmitting messages to the UE 115-a by varying the frequencies with which messages or portions of messages are transmitted. Frequency hopping may improve communications reliability, as increasing frequency diversity may increase the likelihood that messages are successfully received. For instance, a first frequency may experience fading, interference, or other degradation, such that a message transmitted to the UE 115-a via the first frequency may be received incorrectly or not received at all. However, if the message is also sent via a second frequency that does not experience such loss, the UE 115-*a* may have a greater chance at receiving at least one of the messages.

As described herein, the base station 105-*a* may activate frequency hopping for DCI transmitted to the UE 115-*a* via PDSCH (e.g., communication link 215) in one or more PDSCH occasions 230. The base station 105-*a* may transmit (e.g., via communication link 210), and the UE 115-*a* may receive, a control message 220 that may indicate that frequency hopping is activated for DCI over a set of symbols of one or more PDSCH occasions 230. The control message 220 may be an example of DCI, an RRC message, a MAC-CE, a previous DCI, or some combination thereof. The UE 115-*a* may determine a frequency hopping configuration (e.g., a frequency hopping pattern, channel information) for the set of symbols based on the control message 220. In some cases, the frequency hopping configuration may be for multiple PDSCH occasions (e.g., a subset or all of the one or more PDSCH occasions 230) or for a single PDSCH occasion. For example, the base station 105-*a* may allocate resources (e.g., time resources, frequency resources) within a PDSCH occasion for the DCI, where the resources are allocated according to the frequency hopping configuration. The base station 105-*a* may transmit the DCI on the resources (e.g., using a same analog beam) via the PDSCH. The UE 115-*a* may monitor the set of symbols of the PDSCH occasion(s) for the DCI according to the frequency hopping configuration.

The UE 115-*a* may determine a frequency hopping configuration for the set of symbols of the one or more PDSCH occasions 230 (e.g., intra-occasion frequency hopping, inter-occasion frequency hopping, or both) based on information included in the control message 220. In some examples, the control message 220 may include frequency hopping information, such as an indication of a frequency hopping configuration or a frequency hopping pattern. For instance, the control message 220 may indicate that one or more symbols of the set of symbols may hop frequencies within a single PDSCH occasion (e.g., intra-occasion frequency hopping), between individual PDSCH occasions (e.g., inter-occasion frequency hopping), or both. In some examples, determining the frequency hopping configuration may include determining a respective time duration for each hop of a set of frequency hops, e.g., based on a length of the DCI. Additionally, or alternatively, determining the frequency hopping configuration may include determining a number of frequency locations across one or more of the PDSCH occasions 230, where the set of symbols may span the number of frequency locations.

In some examples, the UE 115-*a* may determine a frequency hopping pattern based on an indication from the base station 105-*a*. For example, the base station 105-*a* may transmit, to the UE 115-*a*, a control message 225 that includes a frequency hopping pattern (e.g., for the frequency hopping configuration) with which the set of symbols carrying the DCI may be transmitted within the one or more PDSCH occasions 230. That is, the control message 225 may enable the UE 115-*a* to determine a frequency hopping configuration. In some cases, the frequency hopping configuration and/or frequency hopping pattern may be indicated separately for each respective PDSCH occasion. In some examples, the frequency hopping configuration or frequency hopping pattern indicated may be for multiple subsequent PDSCH occasions. For example, the control message 225 may indicate that a frequency hopping pattern is for a number or a subset of the one or more PDSCH occasions 230. Alternatively, the control message 225 may indicate that a frequency hopping pattern is to be used until changed, e.g., by the base station 105-*a* via a subsequent RRC, MAC-CE, DCI, or some combination thereof.

As an example, the control message 225 may include an indication of (i.e., may explicitly indicate) a sequence of offsets for a set of starting resource blocks of the set of symbols; the sequence of offsets may be relative to a frequency allocation of a respective PDSCH occasion or may be relative to a bandwidth part (BWP) allocation of the one or more PDSCH occasions 230. Alternatively, the control message 225 may include an indication of (i.e., may explicitly indicate) an index that corresponds to a set of starting resource blocks of the set of symbols. Such indications may thus enable the UE 115-*a* to determine explicit locations of the set of symbols in a respective PDSCH occasion. In some cases, the control message 225 may additionally or alternatively indirectly indicate a frequency hopping pattern, e.g., by indicating a hopping step, a sequence of hopping steps, or a set of frequency locations for the set of symbols. That is, the UE 115-*a* may determine the frequency hopping pattern (and, thus, the locations of the set of symbols in a respective PDSCH occasion) based on the hopping step, the sequence of hopping steps, or the set of frequency locations.

The frequency hopping configuration and/or frequency hopping pattern may be for inter-occasion frequency hopping, intra-occasion frequency hopping, or both, and may be for one or more of the PDSCH occasions 230. For instance, the UE 115-*a* may determine (e.g., based on the control message 220, the control message 225, or both) that the frequency hopping pattern is for intra-occasion frequency hopping within a single PDSCH occasion of the one or more PDSCH occasions 230. The DCI may be transmitted over the set of symbols within the single PDSCH occasion, where the frequency locations of the DCI may change within the single PDSCH occasion based on the frequency hopping pattern. Additionally, or alternatively, the UE 115-*a* may determine that a frequency hopping pattern is for inter-occasion frequency hopping across multiple PDSCH occasions, such that the DCI is transmitted over the set of symbols across the multiple PDSCH occasions. In such cases, the frequency locations of the DCI may change with each of the multiple PDSCH occasions. In some examples, the UE 115-*a* may determine that the frequency hopping pattern includes both inter-occasion frequency hopping and intra-occasion frequency hopping. The set of symbols may, for example, span multiple PDSCH occasions, and the DCI may be transmitted on frequencies that vary both within a PDSCH occasion and across PDSCH occasions.

The UE 115-*a* may monitor the set of symbols of the one or more PDSCH occasions 230 for the DCI based on the frequency hopping configuration, the frequency hopping pattern, or some combination thereof. The base station 105-*a* may transmit the DCI using the set of symbols of the one or more PDSCH occasions 230 via the PDSCH (e.g., via the communication link 215). In the example of FIG. 2, the UE 115-*a* may monitor the set of symbols of a PDSCH occasion 230 based on a frequency hopping configuration indicated by the control message 225 or the control message 220. For instance, the UE 115-*a* may monitor each hop of a set of hops of the DCI over the set of symbols, where the set of symbols may be within the PDSCH occasion 230. Additionally or alternatively, the set of symbols may be within two or more PDSCH occasions of the one or more PDSCH occasions. The UE 115-*a* may monitor each hop of the set of hops across multiple PDSCH occasions (e.g., of the one or more PDSCH occasions).

In some examples, the base station 105-a may transmit one or more downlink reference signals (e.g., DMRSs) with the DCI in the one or more PDSCH occasions 230. Transmission of the downlink reference signals may be based on the frequency hopping configuration such that the UE 115-a may account for the varying frequencies associated with the frequency hopping configuration when performing channel estimation of the PDSCH occasion. For example, the UE 115-a may monitor each hop of a set of hops for one or more downlink reference signals, where the set of hops may be within one or more PDSCH occasions 230 based on the frequency hopping configuration. The UE 115-a may perform channel estimation of the one or more PDSCH occasions 230 based on the respective downlink reference signals.

In some cases, the base station 105-a may deactivate frequency hopping of DCI in one or more PDSCH occasions. For example, the UE 115-a may receive, from the base station 105-a, a control message (e.g., a control message 220) that deactivates frequency hopping of DCI in at least one or more PDSCH occasions subsequent to the control message.

Figure 3A:
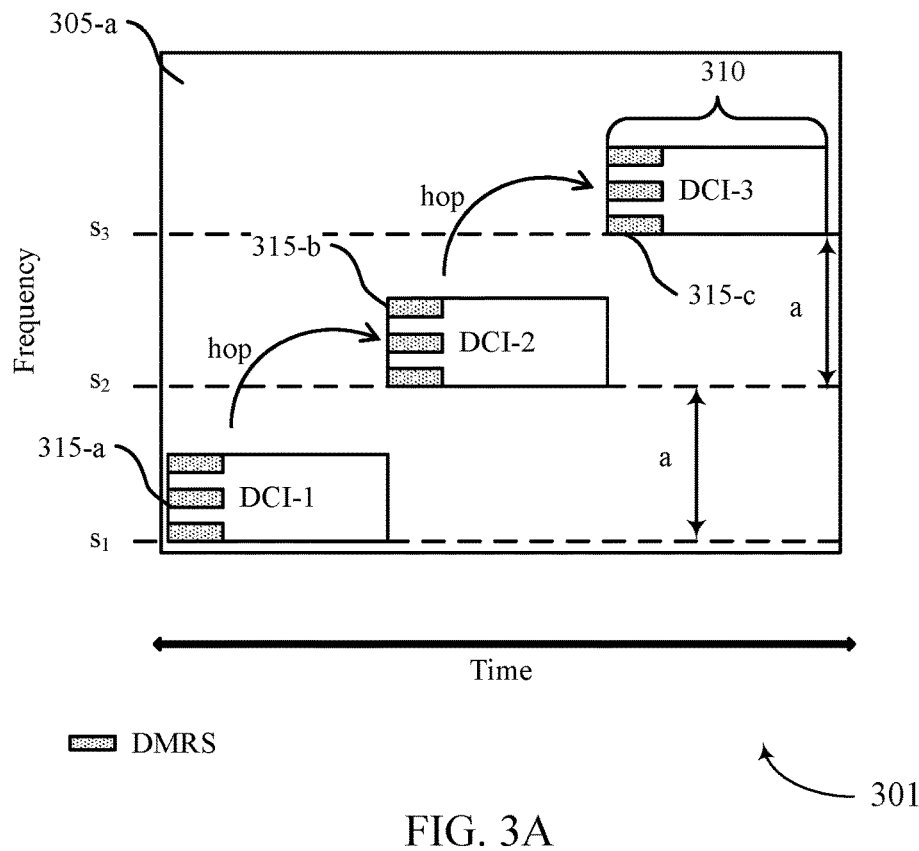
FIGS. 3A and 3B illustrate examples of frequency hopping procedures that support frequency hopping for control information in downlink shared channel in accordance with aspects of the present disclosure.
Figure 3B:
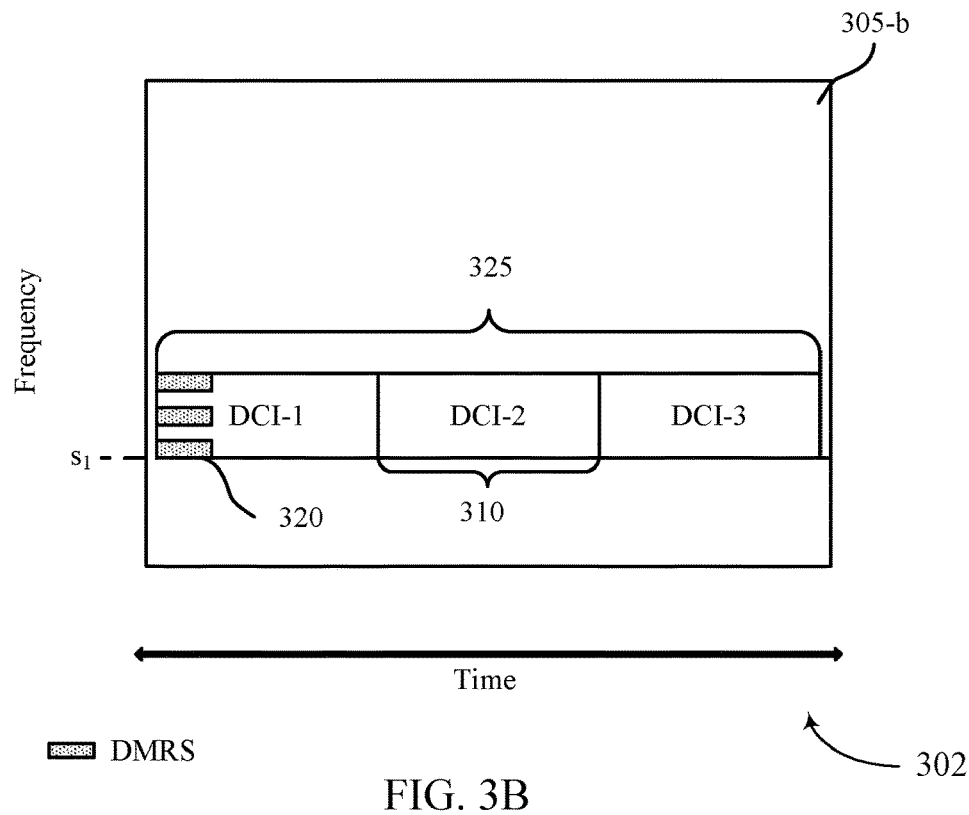

FIGS. 3A and 3B illustrate examples of frequency hopping procedures 301 and 302 in accordance with various aspects of the present disclosure. In some examples, the frequency hopping procedures 301 and 302 may implement aspects of the wireless communications systems 100 or 200. For example, the frequency hopping procedures 301 and 302 may be used by a UE 115 and a base station 105 for transmitting DCI over a downlink shared channel according to a frequency hopping configuration, as described with reference to FIGS. 1 and 2.

As described herein, a base station may transmit, to a UE, a control message including an indication that frequency hopping of DCI in a downlink shared channel (e.g., a PDSCH) is activated. The UE may determine a frequency hopping configuration for the DCI, where the DCI may be transmitted over a set of symbols of one or more PDSCH occasions (e.g., PDSCH occasions 305-a and 305-b), and may monitor the set of symbols for the DCI according to the frequency hopping configuration. Frequency hopping of DCI in a PDSCH occasion may increase signal reliability due to increased frequency diversity, as the UE may have a greater likelihood of successfully receiving DCI over at least one frequency if channel conditions are poor.

The UE may determine, based on the control message transmitted by the base station, a frequency hopping pattern (e.g., for the frequency hopping configuration) for the one or more PDSCH occasions. In some examples, the UE may utilize a frequency hopping pattern stored in the UE. In other examples, the UE may receive an indication of a frequency hopping pattern from the base station, e.g., as part of a control message. For example, the UE may receive an indication of (or may determine) one or more starting resource blocks of the set of symbols. Additionally, or alternatively, the UE may receive an indication of (or may determine) characteristics of the frequency hopping pattern. For example, the base station may define an initial intra-occasion frequency hop by transmitting an indication of three starting resource blocks to the UE: $s_1$, $s_2$, and $s_3$. The base station may additionally or alternatively transmit an indication of a frequency hop interval (e.g., $\Delta_{RB}^{intra}=\alpha$) that the UE may use to determine frequency hops between DCI symbols. In the example of FIG. 3A, each DCI symbol within PDSCH occasion 305-a may be offset by an interval a corresponding to a frequency hopping step for each DCI symbol. In still other examples, the UE may determine a set of frequency locations for the set of symbols of the one or more PDSCH occasions, where the set of frequency locations may be based at least in part on a resource index of a synchronization signal in a reference signal or a system frame number associated with the one or more PDSCH occasions. In any case, the UE may monitor the set of symbols of the one or more PDSCH occasions for the DCI based on the frequency hopping pattern (e.g., based on a frequency hopping step, the set of frequency locations, etc.).

FIG. 3A illustrates an example of an intra-occasion frequency hopping procedure 301 for transmitting DCI within a single PDSCH occasion 305-a. For example, the PDSCH occasion 305-a may include a set of three symbols over which the DCI may be transmitted: DCI-1, DCI-2, and DCI-3. The set of symbols may hop (e.g., change) frequencies within the PDSCH occasion 305-a according a frequency hopping configuration determined by the UE (e.g., and, in some cases, indicated by the base station) as described herein. The UE may monitor the set of symbols for the DCI based on the frequency hopping configuration.

In the example of FIG. 3A, the UE may determine the frequency hopping configuration for the symbols DCI-1, DCI-2, and DCI-3 by determining a hopping step a. The UE may also determine a time duration of each hop, for instance, based on a length (e.g., in the time domain) of the DCI. In the example of FIG. 3A, each hop may have a time duration of one symbol 310. Thus, the DCI symbols in the PDSCH occasion 305-a may be offset in the frequency domain by the hopping step a per hop (e.g., per symbol in the frequency domain, with respect to a frequency allocation of the PDSCH occasion 305-a). Alternatively, the UE may determine starting resource blocks) (e.g., a set of frequency locations) for the symbols DCI-1, DCI-2, and DCI-3. For example, the UE may determine that the symbol DCI-1 is associated with a first resource block $s_1$, the symbol DCI-2 is associated with a second resource block $s_2$, and the symbol DCI-3 is associated with a third resource block $s_3$.

In some cases, the base station may also transmit a DMRS 315 in each hop of the DCI in the PDSCH occasion 305-a, to enable the UE to perform channel estimation for the PDSCH occasion 305-a based on the frequency hopping configuration. For instance, a first DMRS 315-a may be transmitted with the symbol DCI-1, a second DMRS 315-b may be transmitted with the symbol DCI-2, and a third DMRS 315-c may be transmitted with the symbol DCI-3. Thus, although the DCI is transmitted via three separate frequency hops, the UE may perform channel estimation based on the DMRS 315 associated with each frequency hop.

In some cases, the frequency hop may have a time duration of multiple symbols 310, or each frequency hop may have a different time duration. For example, DCI may be transmitted over three symbols within a PDSCH occasion 305-a. The DCI may be transmitted according to a first frequency hop with a time duration of two symbols, where the two symbols may also include a first DMRS corresponding to the first frequency hop. The third symbol of the DCI may be transmitted according to a second frequency hop with a time duration of one symbol, where the third symbol may also include a second DMRS corresponding to the third frequency hop. The UE may thus perform channel estimation for the PDSCH occasion 305-a according to the two frequency hops.

In some cases, the base station may deactivate intra-occasion frequency hopping within a single PDSCH occasion 305-b, as illustrated in FIG. 3B. For instance, the base station may transmit a control message indicating that DCI may no longer hop frequencies within the PDSCH occasion 305-b. Thus, all symbols of the DCI (e.g., DCI-1, DCI-2, and DCI-3) may therefore be transmitted on a same frequency. The base station may transmit DMRS(s) (e.g., DMRS 320) in some or all DCI symbols in the PDSCH occasion 305-b. For example, the base station may transmit a DMRS 320 in each (e.g., every) symbol of the DCI or in a subset of symbols of the DCI. In some cases, the base station may transmit DMRS 320 in a subset of symbols to save on overhead when frequency hopping is not configured. The UE 115-a may perform channel estimation for the PDSCH 305-b. In some cases, the base station may allocate DMRS 320 to any DCI symbol independently (e.g., DMRS 320 to DCI-3 that is separate or different from DMRS 320 for DCI-2 or DCI-1, or both).

Figure 4:
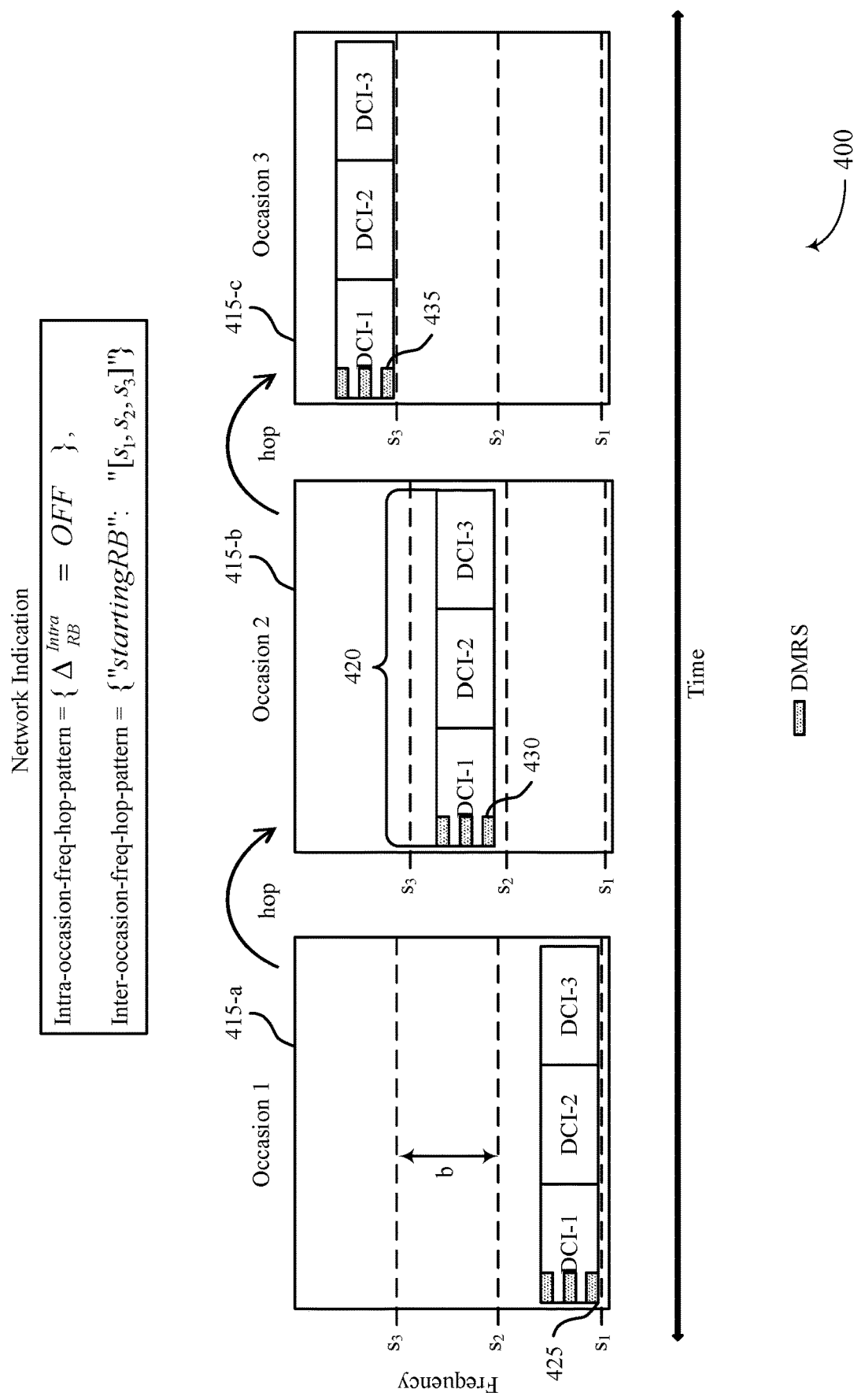
FIGS. 4 and 5 illustrate examples of multi-occasion frequency hopping procedures that support frequency hopping for control information in downlink shared channel in accordance with aspects of the present disclosure.

FIG. 4 illustrates an example of a multi-occasion frequency hopping procedure 400 that supports frequency hopping for control information in downlink shared channels in accordance with various aspects of the present disclosure. In some examples, the multi-occasion frequency hopping procedure 400 may implement aspects of the wireless communications system 100 or wireless communications system 200. For example, the multi-occasion frequency hopping procedure 400 may be implemented by a UE 115 and a base station 105, as described with reference to FIGS. 1 and 2.

As described herein, a base station may transmit, to a UE, a control message including an indication that frequency hopping of DCI in a downlink shared channel (e.g., a PDSCH) is activated. The UE may determine a frequency hopping configuration for the DCI, where the DCI may be transmitted over a set of symbols of one or more PDSCH occasions (e.g., PDSCH occasions 415-a, 415-b, and 415-c), and may monitor the set of symbols for the DCI according to the frequency hopping configuration. Frequency hopping of DCI in a PDSCH occasion may increase signal reliability due to increased frequency diversity, as the UE may have a greater likelihood of successfully receiving DCI over at least one frequency if channel conditions are poor.

The UE may determine, based on the control message transmitted by the base station, a frequency hopping pattern (e.g., for the frequency hopping configuration) for the PDSCH occasions 415-a, 415-b, and 415-c. In some examples, the UE may utilize a frequency hopping pattern stored in the UE. In other examples, the UE may receive an indication of a frequency hopping pattern from the base station, e.g., as part of a control message. For example, the UE may receive an indication of (or may determine) one or more starting resource blocks of the set of symbols. Additionally, or alternatively, the UE may receive an indication of (or may determine) characteristics of the frequency hopping pattern. For example, the base station may define the frequency hopping pattern by transmitting an indication of (e.g., an index corresponding to) an initial resource block, $s_1$, to the UE. Alternatively, the base station may transmit an indication of a set of initial resource blocks for the set of symbols (e.g., "startingRB": "$[s_1, s_2, s_3]$"). In some examples, the base station may transmit an indication of a frequency hopping interval (e.g., $\Delta_{RB}^{inter}=b$), e.g., one or more offsets which the UE may use to determine the frequency hopping steps for the frequency hopping pattern. In some instances, the base station may transmit a set of frequency locations for the set of symbols, which may be based on a resource index of a synchronization signal in a reference signal associated with one or more PDSCH occasions or a system frame number associated with one or more PDSCH occasions.

In the example of FIG. 4, the frequency hopping configuration may indicate that DCI is to be transmitted over a set of symbols of three PDSCH occasions 415-a, 415-b, and 415-c. The set of symbols may hop frequencies for each PDSCH occasion 415. That is, each hop of the frequency hopping pattern may have a time duration of three symbols 420 (e.g., DCI-1, DCI-2, and DCI-3) such that the DCI symbols transmitted within a PDSCH occasion 415 are transmitted on a same frequency. Each hop of the frequency hopping pattern may have a size b (e.g., in the frequency domain), such that each set of DCI symbols in a PDSCH occasion 415 are offset in the frequency domain by an interval b. Put another way, the DCI frequency allocation may change between each PDSCH occasion 415 by a specified offset (e.g., interval b). Further, a DMRS may be transmitted with each hop. For example, a first DMRS 425 may be transmitted in the first hop (i.e., in the first PDSCH occasion 415-a), a second DMRS 430 may be transmitted in the second hop (e.g., in the second PDSCH occasion 415-b), and a third DMRS 435 may be transmitted in the third hop (e.g., in the third PDSCH occasion 415-b).

The UE may determine the frequency hopping pattern for the set of symbols of the PDSCH occasion 415 based on the time duration of the hop, the interval b, or some combination thereof. For instance, the UE may receive an indication of the time duration of the hop and may determine that the DCI may vary in frequency every three symbols. In some cases, the UE may determine a sequence of hopping steps or a frequency location for each set of symbols of the PDSCH occasions 415, among other examples.

In some cases, the location of the DCI symbols within a PDSCH occasion 415 may be explicitly determined by the UE based on the frequency hopping pattern. The UE may determine (e.g., based on an indication transmitted by the base station) that DCI symbols transmitted in the first PDSCH occasion 415-a may be located at a set of starting resource blocks $s_1$, DCI symbols transmitted in the second PDSCH occasion 415-b may be located at a set of starting resource blocks $s_2$, and DCI symbols transmitted in the third PDSCH occasion 415-c may be located at a set of starting resource blocks $s_3$. As an example, the UE may receive an indication of the frequency hopping pattern and may determine $s_1$, $s_2$, and $s_3$ by determining a sequence of offsets relative to a frequency allocation of the associated PDSCH occasion 415. For instance, the UE may determine an offset for $s_1$ relative to an active BWP allocation of PDSCH occasion 415-a. In another example, the UE may determine an index corresponding to $s_1$.

In some aspects, the base station may indicate that the frequency hopping pattern may be for all of the PDSCH occasions 415 or for a subset of the PDSCH occasions 415. That is, in some cases, the same frequency hopping pattern may be used for the set of symbols for multiple PDSCH occasions 415, while in other cases, the frequency hopping pattern may vary across PDSCH occasions 415. For instance, the frequency hopping interval b may differ between every PDSCH occasion 415, or the frequency hopping pattern may include a sequence of frequency hopping steps that may repeat after a certain number of PDSCH occasions 415, or the UE may determine a sequence of offsets for the set of starting resource blocks, among other examples. As another example, the base station may indicate that a frequency hopping pattern may persist for a number K of subsequent PDSCH occasions 415 through a pattern of K values. In some cases, the frequency hopping pattern may be used for each subsequent PDSCH occasions until changed, e.g., by another indication from the base station, such as an indication of a different frequency pattern or an indication that frequency hopping is deactivated.

The UE may monitor the set of symbols of each PDSCH occasion 415 for the DCI based on the frequency hopping pattern and/or the frequency hopping configuration. Further, the UE may monitor the set of symbols of each PDSCH occasion for the accompanying DMRS. In the example of FIG. 4, as the frequency hopping configuration is for inter-occasion frequency hopping (e.g., such that the set of symbols is transmitted on a same frequency within each PDSCH occasion 415), the set of symbols within each PDSCH occasion 415 may be associated with a single DMRS. Put another way, the base station may transmit a DMRS on the set of symbols when the set of symbols changes locations in the domain. The UE may therefore perform channel estimation for each PDSCH occasion 415 based on the associated DMRS.

Figure 5:
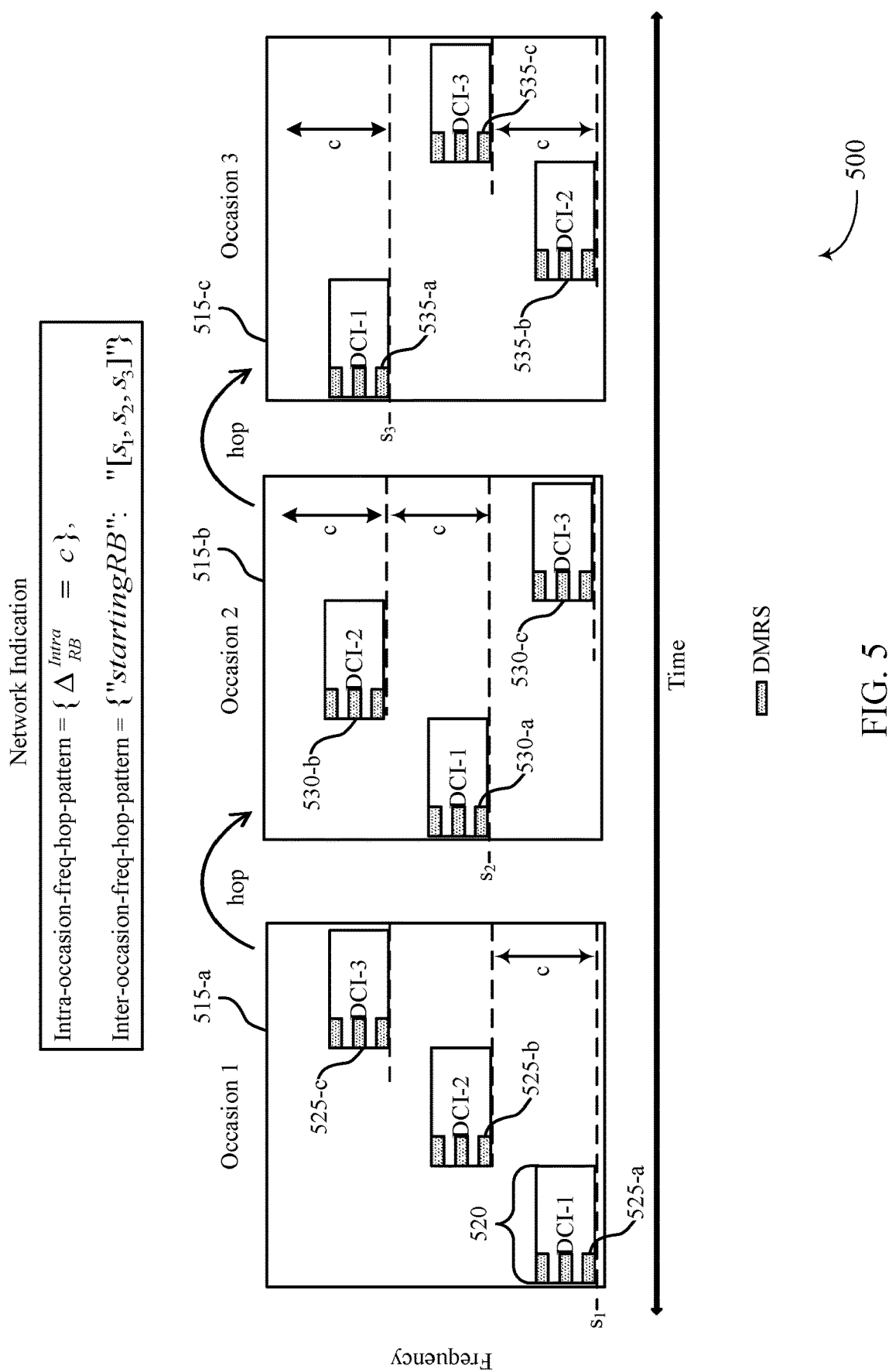

FIG. 5 illustrates an example of a multi-occasion frequency hopping procedure 400 that supports frequency hopping for control information in downlink shared channels in accordance with various aspects of the present disclosure. In some examples, the multi-occasion frequency hopping procedure 500 may implement aspects of the wireless communications system 100 or wireless communications system 200. For example, the multi-occasion frequency hopping procedure 500 may be implemented by a UE 115 and a base station 105, as described with reference to FIGS. 1 and 2.

As described herein, a base station may transmit, to a UE, a control message including an indication that frequency hopping of DCI in a downlink shared channel (e.g., a PDSCH) is activated. The UE may determine a frequency hopping pattern corresponding to a frequency hopping configuration for the DCI, where the DCI may be transmitted over a set of symbols of one or more PDSCH occasions (e.g., PDSCH occasions 515-a, 515-b, and 515-c), and may monitor the set of symbols for the DCI according to the frequency hopping configuration.

In the example of FIG. 5, the frequency hopping configuration may be for both inter-occasion frequency hopping and intra-occasion frequency hopping. DCI may be transmitted on a set of symbols in each PDSCH occasion 515 according to the frequency hopping configuration, where the set of symbols may change in frequency within each PDSCH occasion and across each PDSCH occasion. The DCI transmitted in each PDSCH occasion 515 may span one or more symbols 520. For example, a DCI with a length of three symbols may be distributed across a set of three symbols of the PDSCH occasion 515, where the set of symbols may hop frequencies within the PDSCH occasion 515. Further, the frequencies over which each set of symbols are transmitted may hop across PDSCH occasions 515. As illustrated in FIG. 5, a first PDSCH occasion 515-a may include a set of three DCI symbols that are associated with an intra-occasion frequency hopping interval (e.g., $\Delta_{RB}^{inter}=c$) and an intra-occasion frequency hopping step that has a time duration of one symbol. In some cases, $\Delta_{RB}^{inter}=c$ may be circular (i.e., the DCI may return to the start of the frequency range after incrementing past a frequency boundary associated with the frequency range). Additionally or alternatively, the base station 105-a may transmit an inter-occasion frequency hopping interval (e.g., a frequency offset) which the UE may use to determine the frequency hops between PDSCH occasions 515. The set of DCI symbols of a second PDSCH occasion 515-b may change in frequency based on the inter-occasion frequency hopping interval from the set of DCI symbols of the first PDSCH occasion 515-a. The set of DCI symbols in the second PDSCH occasion 515-b may hop frequencies within the PDSCH occasion 415-b, e.g., according to an inter-occasion frequency hopping step. A third PDSCH occasion 515-c may include a set of DCI symbols that change in frequency within the PDSCH occasion 515-c as well as changing in frequency from the second PDSCH occasion 515-b.

The UE may determine the frequency hopping pattern for the set of symbols of the PDSCH occasions 515 based on the intra-occasion frequency hopping steps, the inter-occasion frequency hopping steps, or both, among other examples. For instance, the UE may determine (e.g., may receive an indication of) a set of starting resource blocks (e.g., "startingRB": "[$s_1$, $s_2$, $s_3$]"). In some cases, the base station may define an initial intra-occasion frequency hopping pattern by transmitting an indication of a starting resource block, $s_1$, for the first PDSCH occasion 515-a, and an offset. The UE may determine that the first DCI symbol of the PDSCH occasion 515-a is associated with the resource block $s_1$ based on the starting resource block indication and that the second DCI symbol of the PDSCH occasion 515-b is associated with the resource block $s_2$ based on the offset.

Additionally or alternatively, the UE may determine the frequency hopping pattern by determining a sequence of starting resource blocks, a sequence of frequency hopping steps, a sequence of offsets of the starting resource blocks, a set of frequency locations, or the like. That is, the UE may determine the location of the DCI symbols in each respective PDSCH occasion 515 based on indicated sequences, rather than, for example, an explicit indication for each DCI symbol and/or each PDSCH occasion 515. As an example, the UE may receive an indication of a set of starting resource blocks for the set of symbols of the PDSCH occasion 515-a as well as an indication of a sequence of frequency hopping steps. The UE may determine the starting resource blocks for the set of symbols of the PDSCH occasion 515-a based on the indication of the set of starting resource blocks, and may determine resource blocks for subsequent DCI symbols (e.g., in the same PDSCH occasion 515-a or across multiple PDSCH occasions 515) based on the sequence of frequency hopping steps.

In the example of FIG. 5, the base station may transmit an indication of a set of starting resource blocks (e.g., "starting RB": "[$s_1$, $s_2$, $s_3$]") corresponding to the set of symbols over which the DCI may be transmitted in the PDSCH occasion 515-a. For example, DCI-1, DCI-2, and DCI-3 may be spaced by $\Delta_{RB}^{intra}=c$ apart from each other. The base station may transmit an indication of an intra-occasion frequency hop interval $\Delta_{RB}^{inter}$ corresponding to the frequency hopping step for the set of symbols within a PDSCH occasion 515 as well as an indication of an inter-occasion frequency hop interval ORB corresponding to the frequency hopping step of the set of symbols between PDSCH occasions 515. The UE may determine the frequency hopping configuration for the set of symbols of each PDSCH occasion 515 based on the indications. For example, in PDSCH occasion 515-a, DCI-1 may be transmitted on the starting resource block $s_1$. DCI-2 may change in frequency by an amount $\Delta_{RB}^{intra}$ with respect to DCI-1. Similarly, DCI-3 may change in frequency by an amount $\Delta_{RB}^{intra}$ with respect to DCI-2. The change in frequency from DCI-3 of PDSCH occasion 515-a to DCI-1 of PDSCH occasion 515-b may correspond to $\Delta_{RB}^{inter}$. The set of symbols within PDSCH occasions 515-b and 515-c may likewise change in frequency according to $\Delta_{RB}^{intra}$ and may change in frequency across PDSCH occasions 515-b and 515-c according to $\Delta_{RB}^{inter}$.

In some examples, the base station may also transmit a DMRS with each DCI symbol (e.g., corresponding to $s_1$, $s_2$, and $s_3$) to enable channel estimation and decoding within PDSCH occasions 515. For example, each DCI symbol in PDSCH occasion 515-*a* may be associated with a DMRS 525, each DCI symbol in PDSCH occasion 515-*b* may be associated with a DMRS 530, and each DCI symbol in PDSCH occasion 515-*c* may be associated with a DMRS 535. Transmitting a DMRS with each symbol that changes in frequency may enable the UE to perform channel estimation for the varying frequencies of each respective PDSCH occasion 515. In some examples, however, the base station may instead refrain from transmitting a DMRS with every symbol that changes in frequency, and the UE may perform channel estimation for the symbols without an associated DMRS by interpolation. For instance, in PDSCH occasion 515-*a*, the base station may transmit a DMRS 525-*a* with DCI-1 and a DMRS 525-*c* with DCI-3, but may refrain from transmitting a DMRS 515-*b* with DCI-2. The UE may perform channel estimation for the PDSCH occasion 515-*a* by interpolating the channel estimations performed for DMRS 515-*a* and DMRS 515-*c*.

Figure 6:
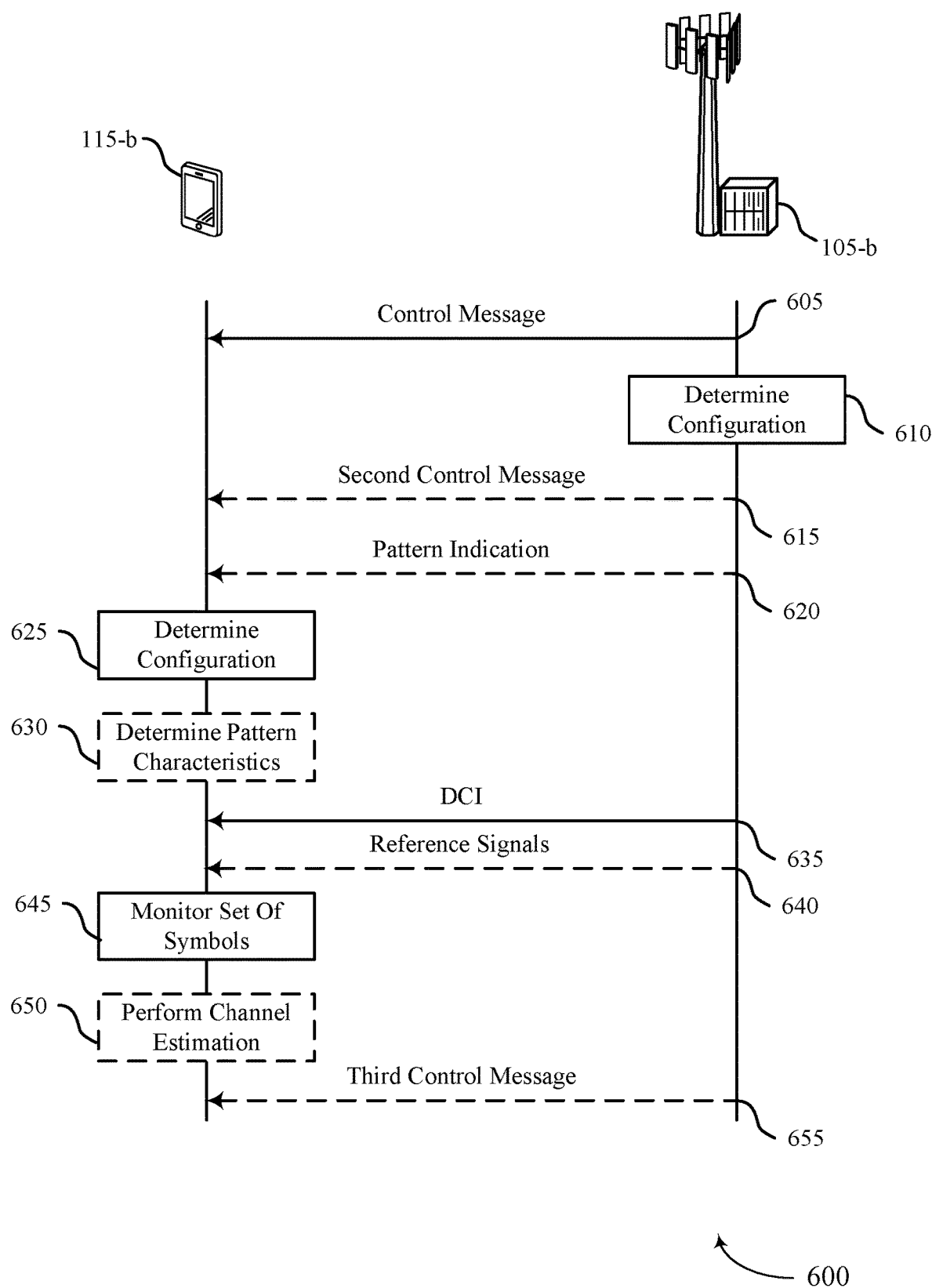
FIG. 6 illustrates an example of a process flow that supports frequency hopping for control information in downlink shared channel in accordance with aspects of the present disclosure.

FIG. 6 illustrates an example of a process flow 600 that supports frequency hopping for control information in downlink shared channel in accordance with aspects of the present disclosure. In some examples, the process flow 600 may implement aspects of wireless communications systems 100 or 200. For example, process flow 600 may include a base station 105-*b* and a UE 115-*b*, which may be examples of corresponding wireless devices as described herein. In the following description of the process flow 600, the operations between the UE 115-*b* and the base station 105-*b* may be transmitted in a different order than the order shown, or the operations performed by the UE 115-*b* and the base station 105-*b* may be performed in different orders or at different times. Certain operations may also be left out of the process flow 600, or other operations may be added to the process flow 600. While the UE 115-*b* and the base station 105-*b* are shown performing operations of process flow 600, any wireless device may perform the operations shown. Further, while FIG. 6 illustrates an example of communications between a UE 115-*b* and a base station 105-*b*, the techniques described herein may be applied to communications between any number of wireless devices.

At 605, the base station 105-*b* may transmit (e.g., via a downlink control channel, such as a PDCCH, or a downlink shared channel, such as a PDSCH) a control message (e.g., DCI, RRC, MAC-CE, among other examples) to the UE 115-*b*. The control message may indicate (e.g., may include an indication) that frequency hopping is activated for DCI in one or more downlink shared channel occasions (e.g., PDSCH occasions) for the UE 115-*b*.

At 610, the base station 105-*b* may determine a frequency hopping configuration for the DCI that is to be frequency hopped. For instance, the base station 105-*b* may determine a frequency hopping configuration for the DCI over a set of symbols of the one or more PDSCH occasions. In some examples, the set of symbols may be within a same PDSCH occasion of the one or more PDSCH occasions (e.g., for intra-occasion frequency hopping), while in other examples, the set of symbols may be within two or more of the PDSCH occasions (e.g., for inter-occasion frequency hopping). The frequency configuration may therefore be for a single PDSCH occasion or multiple PDSCH occasions.

At 615, the base station 105-*b* may optionally transmit a second control message (e.g., DCI, RRC, MAC-CE, among other examples) to the UE 115-*b*. The second control message may indicate a frequency hopping pattern for the DCI over the set of symbols. The frequency hopping pattern may, in some cases, be for the frequency hopping configuration (e.g., determined at 610). In some examples, the frequency hopping pattern may be for a single PDSCH occasion or a group of PDSCH occasions, e.g., for each PDSCH occasion of the one or more PDSCH occasions, a subset of the one or more PDSCH occasions, or all of the one or more PDSCH occasions. In some cases, the frequency hopping pattern may be for the PDSCH occasions associated with the set of symbols. For example, the set of symbols may be within a first PDSCH occasion, and the indicated frequency hopping pattern may be for at least the first PDSCH occasion. As another example, the set of symbols may be within a group of multiple PDSCH occasions, and the indicated frequency hopping pattern may be for the group of multiple PDSCH occasions.

In some examples, the base station 105-*b* may transmit an indication of a frequency hopping pattern for the DCI over the set of symbols. For instance, at 620, the base station 105-*b* may transmit, and the UE 115-*b* may receive, an indication of a frequency hopping pattern on a message other than the second control message at 615. In another example, the base station 105-*b* may transmit a frequency hopping pattern indication as part of the control message transmitted at 605.

At 625, based on the control message received at 605, the second message optionally received at 615, the frequency hopping pattern indication optionally received at 620, or some combination thereof, among other examples, the UE 115-*b* may determine a frequency hopping configuration for the DCI over the set of symbols. For example, the control message may include an indication of a frequency hopping configuration. Alternatively, the control message may include frequency hopping information such that the UE 115-*b* may determine the frequency hopping configuration. As another example, the UE 115-*b* may determine a frequency hopping configuration at the UE 115-*b*, e.g., a preconfigured or stored frequency hopping configuration, based on the indication (e.g., received in the control message at 605) that frequency hopping is activated. In some examples, determining the frequency hopping configuration may include determining the frequency hopping pattern.

The UE 115-*b* may, for example, determine a respective time duration for each hop of a set of frequency hops (e.g., indicated by the frequency hopping configuration). The respective time durations may be based on a length of the DCI. Additionally, or alternatively, the UE 115-*b* may determine a number of frequency locations across multiple PDSCH occasions of the one or more PDSDCH occasions as indicated by the frequency hopping configuration, where the set of symbols spans the number of frequency locations.

At 630, the UE 115-*b* may determine a frequency hopping pattern and/or associated pattern characteristics for the DCI over the set of symbols. For instance, if the UE 115-*b* receives (e.g., at 605, at 615, at 620, or some combination thereof), from the base station 105-*b*, an indication of a frequency hopping pattern, the UE 115-*b* may determine associated pattern characteristics based on the indication. As an example, the UE 115-*b* may determine a sequence of offsets for a set of starting resource blocks of the set of symbols based on the frequency hopping pattern. The sequence of offsets may be relative to a frequency allocation of a respective PDSCH occasion (e.g., of the one or more PDSCH occasions) or may be relative to a BWP allocation of the one or more PDSCH occasions or an active BWP associated with the UE 115-*b*. Additionally, or alternatively, the UE 115-*b* may determine (e.g., based on the frequency hopping pattern) an index corresponding to a set of starting resource blocks of the set of symbols. In some examples, the UE 115-*b* may determine a hopping step, a sequence of hopping steps, a set of frequency locations, or some combination thereof, for the set of symbols and based on the frequency hopping pattern. In such examples, the set of frequency locations may be based on a resource index of a synchronization signal of a reference signal (e.g., a downlink reference signal, such as a DMRS), where the reference signal may be associated with the one or more PDSCH occasions. The set of frequency locations may additionally or alternatively be based on a system frame number associated with at least one of the one or more PDSCH occasions.

At 635, the base station 105-*b* may transmit, and the UE 115-*b* may monitor for, the DCI on PDSCH using the set of symbols of the one or more PDSCH occasions in accordance with the frequency hopping configuration, the frequency hopping pattern, or some combination thereof.

At 640, the base station 105-*b* may optionally transmit, and the UE 115-*b* may monitor for, one or more downlink reference signals (e.g., DMRSs). Transmission of the downlink reference signals may be based on the frequency hopping configuration. For instance, the base station 105-*b* may transmit a downlink reference signal in each hop of a set of hops of the DCI. If the frequency hopping configuration is for intra-occasion frequency hopping, each hop within a single PDSCH occasion may include a downlink reference signal. If the frequency hopping configuration is for inter-occasion frequency hopping, each hop within a PDSCH occasion of the multiple PDSCH occasions may include a downlink reference signal.

At 645, the UE 115-*b* may monitor the set of symbols of the one or more PDSCH occasions for the DCI according to the frequency hopping configuration and, in some cases, the frequency hopping pattern. For example, if the frequency hopping configuration is for a set of symbols within a single PDSCH occasion, the UE 115-*b* may monitor the single PDSCH occasion for the DCI. Further, if the UE 115-*b* determined the frequency hopping pattern, the UE 115-*b* may monitor based on the frequency hopping pattern and/or the associated pattern characteristics. For instance, if the UE 115-*b* determines a hopping step, a sequence of hopping steps, a set of frequency locations, a set of starting resource blocks, or a sequence of offsets, the UE 115-*b* may monitor the one or more PDSCH occasions based on the hopping step, the sequence of hopping steps, the set of frequency locations, the set of starting resource blocks, or the sequence of offsets, or any combination thereof.

Additionally, if the base station 105-*b* transmits one or more downlink reference signals at 640, the UE 115-*b* may monitor for the downlink reference signals at 645. For example, the UE 115-*b* may monitor each hop of the set of hops of the DCI for a downlink reference signal. The UE 115-*b* may monitor for the downlink reference signal in a single PDSCH occasion or in multiple PDSCH occasions, e.g., based on the frequency hopping configuration of the DCI.

As a specific example, the UE 115-*b* may determine an index corresponding to a set of starting resource blocks of the set of symbols and a hopping step with a time duration of one symbol. The UE 115-*b* may also determine that the frequency hopping configuration is for two PDSCH occasions of the one or more PDSCH occasions. The UE 115-*b* may therefore monitor the starting resource blocks of the first PDSCH occasion (e.g., of the two PDSCH occasions of the frequency hopping configuration) for the DCI and for a first downlink reference signal. The UE 115-*b* may then monitor the next set of resource blocks for the DCI and a second downlink reference signal based on the hopping step, and so forth, for the first PDSCH occasion. Thus, the UE 115-*b* may monitor for a downlink reference signal in each hop of the frequency hopping configuration. In other words, the UE 115-*b* may monitor for multiple downlink reference signals within a single PDSCH occasion if the set of symbols of the DCI hops frequencies within the single PDSCH occasion. The UE 115-*b* may also monitor the second PDSCH occasion (e.g., of the two PDSCH occasions of the frequency hopping configuration) for the DCI and downlink reference signals according to the frequency hopping configuration.

At 650, if the UE 115-*b* received one or more downlink reference signals, the UE 115-*b* may perform channel estimation based on the one or more downlink reference signals for the associated PDSCH occasions. For example, if the UE 115-*b* receives multiple downlink reference signals in a single PDSCH occasion, the UE 115-*b* may perform channel estimation for the PDSCH occasion based on each respective downlink reference signal. If the UE 115-*b* receives multiple downlink reference signals across multiple PDSCH occasions, the UE 115-*b* may perform channel estimation for each PDSCH occasion based on the respective downlink reference signals.

At 655, the UE 115-*b* may receive a third control message (e.g., a DCI, an RRC message, a MAC-CE, etc.) from the base station 105-*b*. The third control message may indicate a change of the frequency hopping configuration, the frequency hopping pattern, or both, for the DCI over the set of symbols. For example, the third control message may indicate a change in the frequency hopping pattern for the set of symbols within a PDSCH occasion or within a group of PDSCH occasions. That is, the third control message may indicate that DCI transmitted over a set of symbols in subsequent PDSCH occasions may be transmitted according to the change in the frequency pattern.

In some cases, the third control message may alternatively indicate that frequency hopping for DCI is deactivated, e.g., in at least one of the one or more PDSCH occasions. For example, the base station 105-*b* may indicate, via the third control message, that frequency hopping is deactivated for DCI transmitted in a PDSCH occasion or a group of PDSCH occasions.

Figure 7:
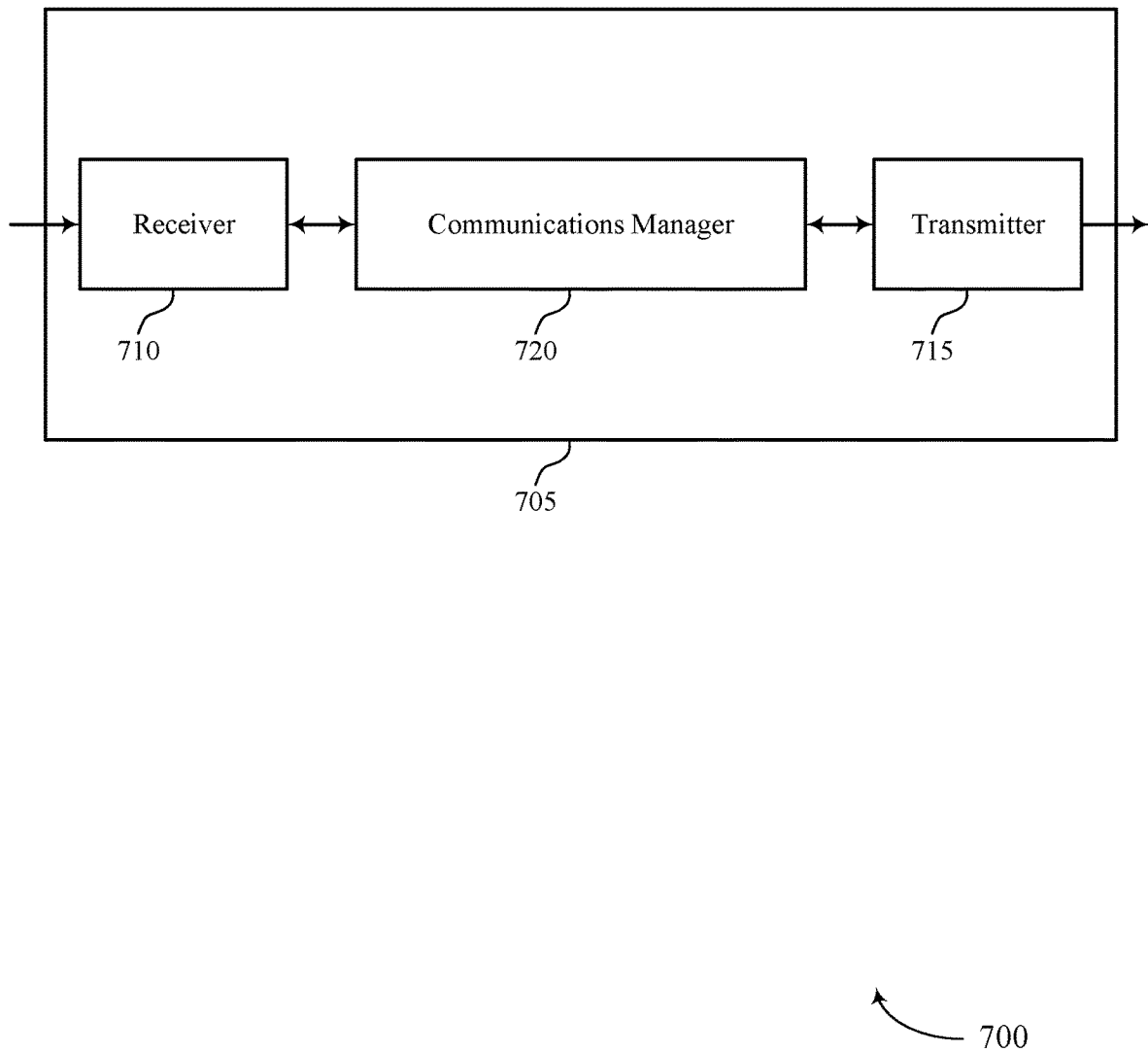
FIGS. 7 and 8 show block diagrams of devices that support frequency hopping for control information in downlink shared channel in accordance with aspects of the present disclosure.

FIG. 7 shows a block diagram 700 of a device 705 that supports frequency hopping for control information in downlink shared channel in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to frequency hopping for control information in downlink shared channel). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to frequency hopping for control information in downlink shared channel). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of frequency hopping for control information in downlink shared channel as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving a control message that indicates frequency hopping is activated for DCI in one or more downlink shared channel occasions for the UE. The communications manager 720 may be configured as or otherwise support a means for determining a frequency hopping configuration for DCI over a set of symbols of the one or more downlink shared channel occasions based on the control message. The communications manager 720 may be configured as or otherwise support a means for monitoring the set of symbols of the one or more downlink shared channel occasions for the DCI in accordance with the frequency hopping configuration.

By including or configuring the communications manager 720 in accordance with examples as described herein, the device 705 (e.g., a processor controlling or otherwise coupled to the receiver 710, the transmitter 715, the communications manager 720, or a combination thereof) may support reducing power consumption and increasing overall signal reliability by receiving DCI over PDSCH according to a frequency hopping configuration. Frequency hopping DCI over PDSCH may enable the device 705 to adapt to suboptimal signal conditions (e.g., interference, deep fading, etc.) while reducing blind decoding operations, which may directly result in more efficient utilization of communication resources, improved coordination between devices, and longer battery life.

Figure 8:
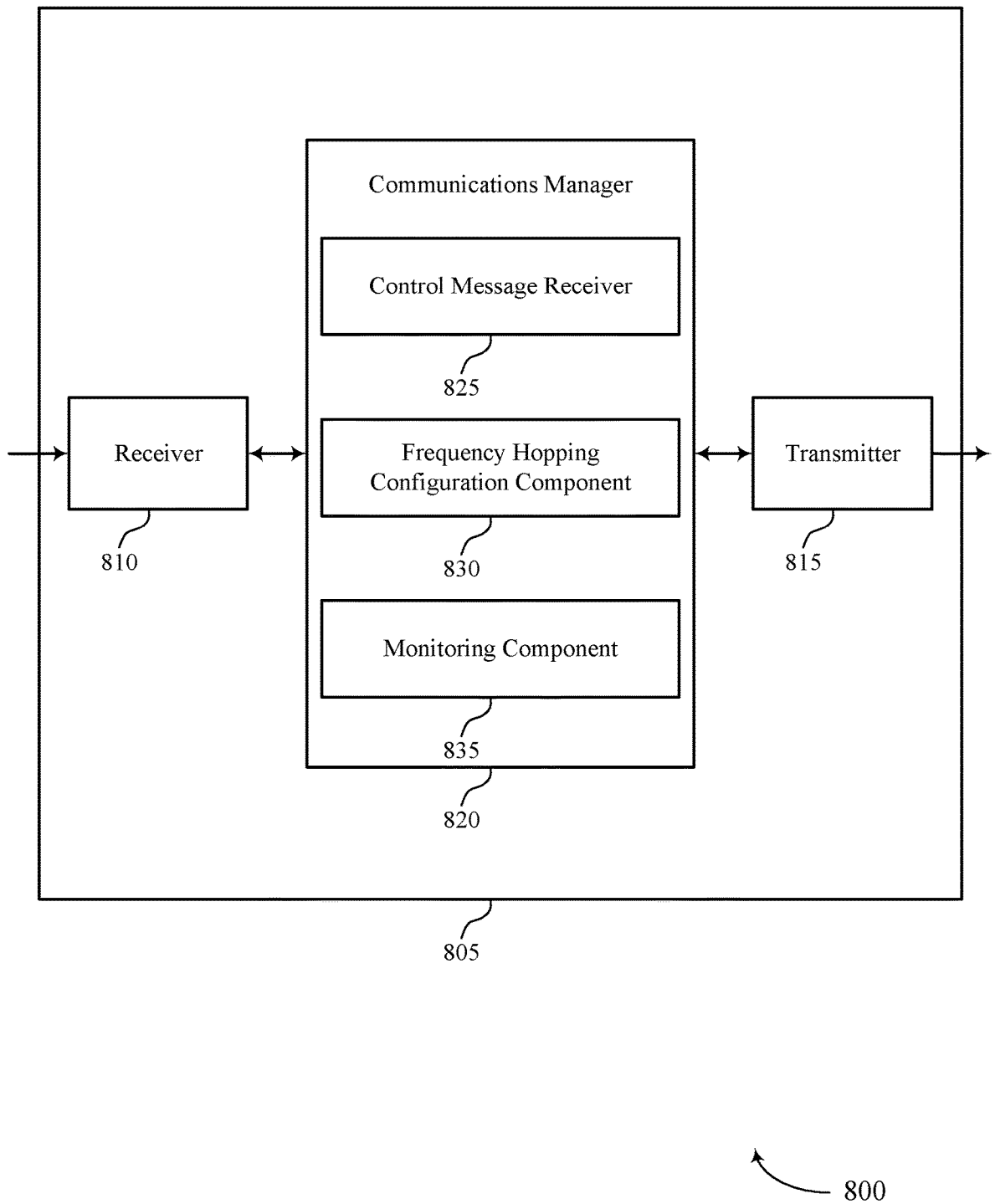

FIG. 8 shows a block diagram 800 of a device 805 that supports frequency hopping for control information in downlink shared channel in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency hopping for control information in downlink shared channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency hopping for control information in downlink shared channel). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of frequency hopping for control information in downlink shared channel as described herein. For example, the communications manager 820 may include a control message receiver 825, a frequency hopping configuration component 830, a monitoring component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The control message receiver 825 may be configured as or otherwise support a means for receiving a control message that indicates frequency hopping is activated for DCI in one or more downlink shared channel occasions for the UE. The frequency hopping configuration component 830 may be configured as or otherwise support a means for determining a frequency hopping configuration for DCI over a set of symbols of the one or more downlink shared channel occasions based on the control message. The monitoring component 835 may be configured as or otherwise support a means for monitoring the set of symbols of the one or more downlink shared channel occasions for the DCI in accordance with the frequency hopping configuration.

Figure 9:
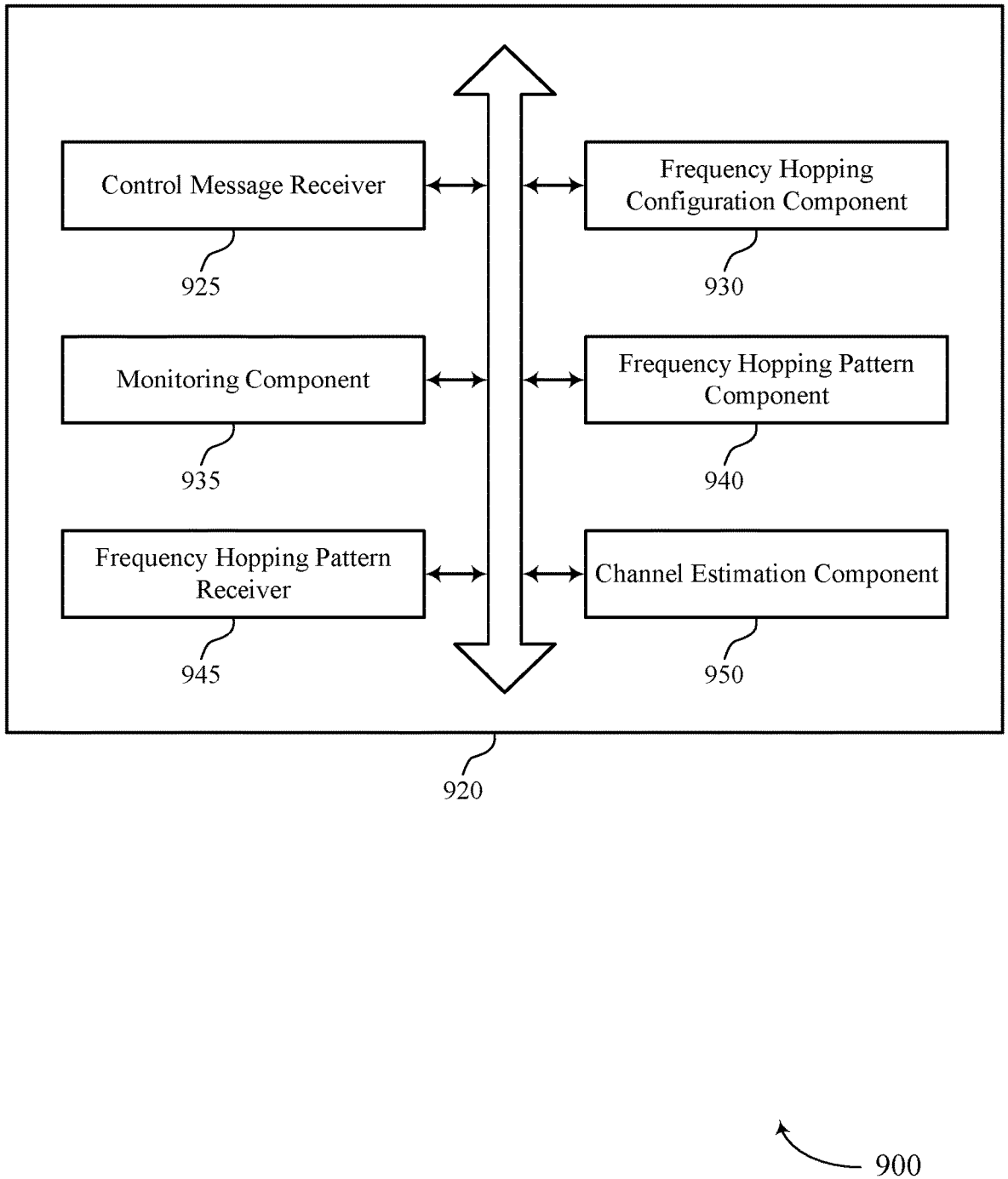
FIG. 9 shows a block diagram of a communications manager that supports frequency hopping for control information in downlink shared channel in accordance with aspects of the present disclosure.

FIG. 9 shows a block diagram 900 of a communications manager 920 that supports frequency hopping for control information in downlink shared channel in accordance with aspects of the present disclosure. The communications manager 920 may be an example of aspects of a communications manager 720, a communications manager 820, or both, as described herein. The communications manager 920, or various components thereof, may be an example of means for performing various aspects of frequency hopping for control information in downlink shared channel as described herein. For example, the communications manager 920 may include a control message receiver 925, a frequency hopping configuration component 930, a monitoring component 935, a frequency hopping pattern component 940, a frequency hopping pattern receiver 945, a channel estimation component 950, or any combination thereof. Each of these components may communicate, directly or indirectly, with one another (e.g., via one or more buses).

The communications manager 920 may support wireless communications at a UE in accordance with examples as disclosed herein. The control message receiver 925 may be configured as or otherwise support a means for receiving a control message that indicates frequency hopping is activated for DCI in one or more downlink shared channel occasions for the UE. The frequency hopping configuration component 930 may be configured as or otherwise support a means for determining a frequency hopping configuration for DCI over a set of symbols of the one or more downlink shared channel occasions based on the control message. The monitoring component 935 may be configured as or otherwise support a means for monitoring the set of symbols of the one or more downlink shared channel occasions for the DCI in accordance with the frequency hopping configuration.

In some examples, to support determining the frequency hopping configuration, the frequency hopping pattern component 940 may be configured as or otherwise support a means for determining a frequency hopping pattern for the DCI over the set of symbols within a single downlink shared channel occasion.

In some examples, the control message receiver 925 may be configured as or otherwise support a means for receiving a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

In some examples, the control message receiver 925 may be configured as or otherwise support a means for receiving a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

In some examples, the frequency hopping configuration component 930 may be configured as or otherwise support a means for determining a respective time duration for each hop of a set of frequency hops indicated by the frequency hopping configuration, the respective time durations based on a length of the DCI. In some examples, the frequency hopping configuration component 930 may be configured as or otherwise support a means for determining a number of frequency locations across multiple downlink shared channel occasions of the one or more downlink shared channel occasions indicated by the frequency hopping configuration, where the set of symbols span the number of frequency locations.

In some examples, the frequency hopping pattern receiver 945 may be configured as or otherwise support a means for receiving, from a base station, an indication of a frequency hopping pattern of the frequency hopping configuration for the one or more downlink shared channel occasions, the frequency hopping pattern for each of the one or more downlink shared channel occasions or a subset of the one or more downlink shared channel occasions.

In some examples, the frequency hopping pattern receiver 945 may be configured as or otherwise support a means for receiving, from a base station, an indication of a frequency hopping pattern of the frequency hopping configuration for the one or more downlink shared channel occasions. In some examples, the frequency hopping pattern component 940 may be configured as or otherwise support a means for determining, based on the frequency hopping pattern, a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a BWP allocation of the one or more downlink shared channel occasions, where the monitoring is based on the sequence of offsets.

In some examples, the frequency hopping pattern receiver 945 may be configured as or otherwise support a means for receiving, from a base station, an indication of a frequency hopping pattern of the frequency hopping configuration for the one or more downlink shared channel occasions. In some examples, the frequency hopping pattern component 940 may be configured as or otherwise support a means for determining, based on the frequency hopping pattern, an index corresponding to a set of starting resource blocks of the set of symbols of the one or more downlink shared channel occasions, where the monitoring is based on the set of starting resource blocks.

In some examples, the frequency hopping pattern receiver 945 may be configured as or otherwise support a means for receiving, from a base station, an indication of a frequency hopping pattern of the frequency hopping configuration for the one or more downlink shared channel occasions. In some examples, the frequency hopping pattern component 940 may be configured as or otherwise support a means for determining, based on the frequency hopping pattern, a hopping step, a sequence of hopping steps, or a set of frequency locations for the set of symbols of the one or more downlink shared channel occasions, where the monitoring is based on the hopping step, the sequence of hopping steps, or the set of frequency locations.

In some examples, the set of frequency locations is based on a resource index of a synchronization signal of a reference signal associated with the one or more downlink shared channel occasions, or a system frame number associated with at least one of the one or more downlink shared channel occasions.

In some examples, the monitoring component 935 may be configured as or otherwise support a means for monitoring each hop of a set of hops of the DCI over the set of symbols within a downlink shared channel occasion of the one or more downlink shared channel occasions for a downlink reference signal. In some examples, the channel estimation component 950 may be configured as or otherwise support a means for performing channel estimation for the downlink shared channel occasion based on the downlink reference signal.

In some examples, the monitoring component 935 may be configured as or otherwise support a means for monitoring each hop of a set of hops of the DCI over the set of symbols across multiple downlink shared channel occasions of the one or more downlink shared channel occasions for one or more downlink reference signals. In some examples, the channel estimation component 950 may be configured as or otherwise support a means for performing channel estimation for the multiple downlink shared channel occasions based on the one or more downlink reference signals.

In some examples, the control message receiver 925 may be configured as or otherwise support a means for receiving a second control message that deactivates frequency hopping for DCI in at least one of the one or more downlink shared channel occasions.

In some examples, the control message includes an RRC message, a MAC-CE, or a DCI message.

In some examples, the set of symbols is within a same downlink shared channel occasion of the one or more downlink shared channel occasions. In some examples, the set of symbols is within two or more downlink shared channel occasions of the one or more downlink shared channel occasions.

Figure 10:
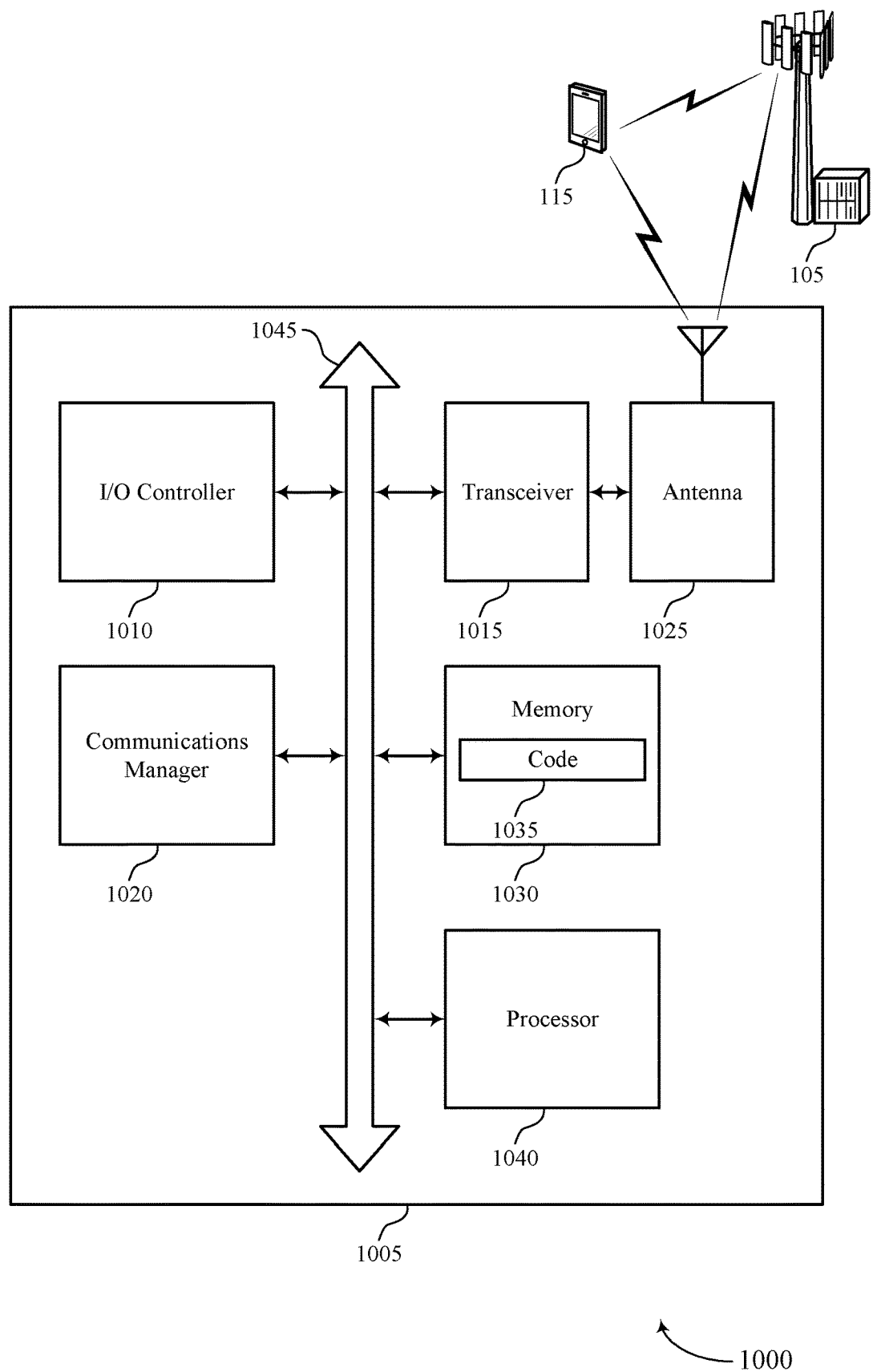
FIG. 10 shows a diagram of a system including a device that supports frequency hopping for control information in downlink shared channel in accordance with aspects of the present disclosure.

FIG. 10 shows a diagram of a system 1000 including a device 1005 that supports frequency hopping for control information in downlink shared channel in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting frequency hopping for control information in downlink shared channel). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a control message that indicates frequency hopping is activated for DCI in one or more downlink shared channel occasions for the UE. The communications manager 1020 may be configured as or otherwise support a means for determining a frequency hopping configuration for DCI over a set of symbols of the one or more downlink shared channel occasions based on the control message. The communications manager 1020 may be configured as or otherwise support a means for monitoring the set of symbols of the one or more downlink shared channel occasions for the DCI in accordance with the frequency hopping configuration.

By including or configuring the communications manager 1020 in accordance with examples as described herein, the device 1005 may support techniques for receiving DCI over PDSCH according to a frequency hopping configuration. Receiving DCI (and, in some cases, downlink reference signals) on varying frequencies may increase frequency diversity, which may provide increased communications reliability. In some examples, the device 1005 may be an example of a redcap device, which may be associated with operating characteristics such as less downlink signaling (e.g., the device 1005 may transmit relatively more uplink signaling and may receive relatively less downlink signaling), low complexity, and low power; in such examples, the device 1005 may further benefit from decreased signaling overhead and power consumption associated with receiving DCI over PDSCH.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of frequency hopping for control information in downlink shared channel as described herein, or the processor 1040 and the memory 1030 may be otherwise configured to perform or support such operations.

Figure 11:
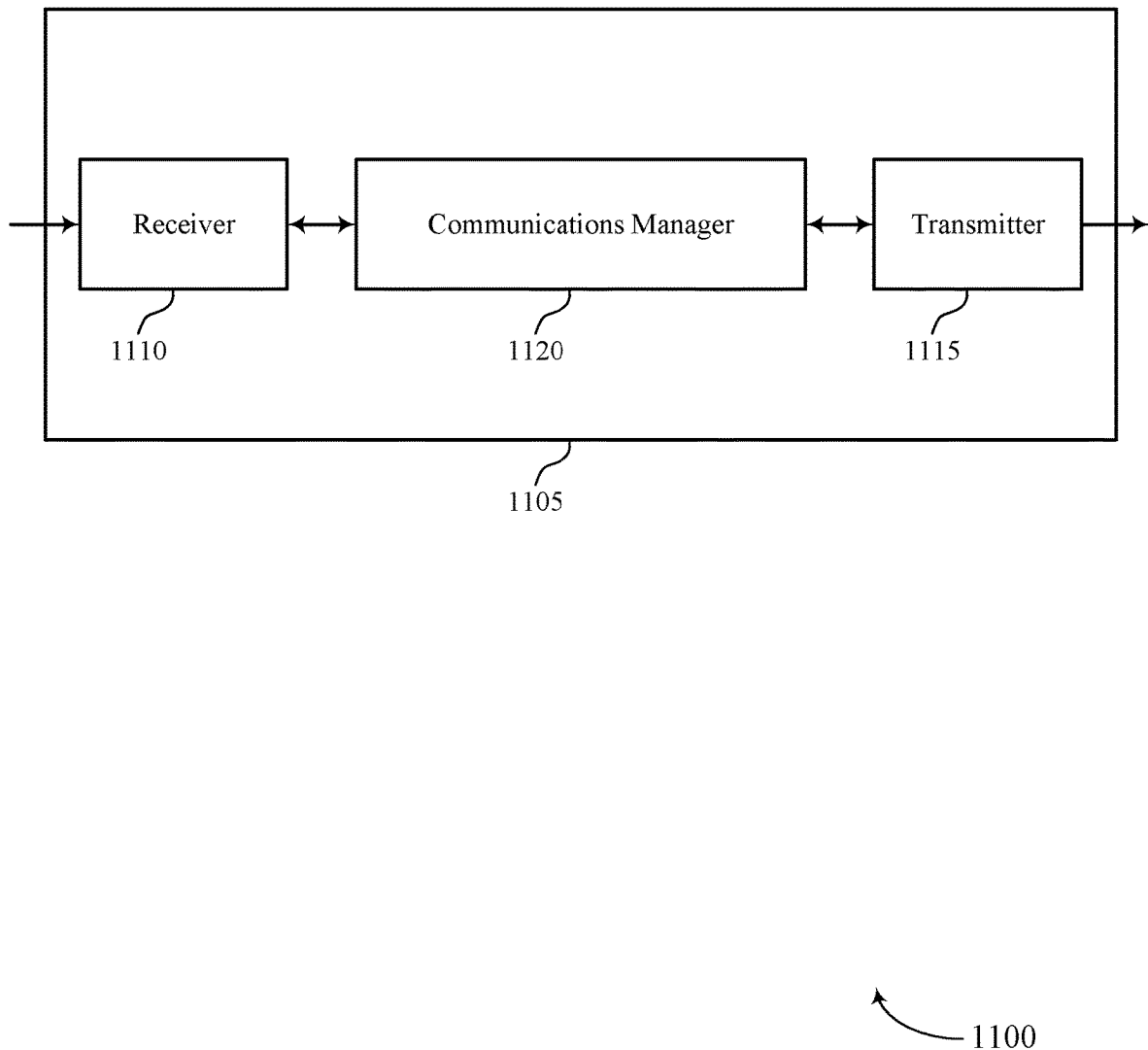
FIGS. 11 and 12 show block diagrams of devices that support frequency hopping for control information in downlink shared channel in accordance with aspects of the present disclosure.

FIG. 11 shows a block diagram 1100 of a device 1105 that supports frequency hopping for control information in downlink shared channel in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to frequency hopping for control information in downlink shared channel). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to frequency hopping for control information in downlink shared channel). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of frequency hopping for control information in downlink shared channel as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, a control message that indicates frequency hopping is activated for DCI in one or more downlink shared channel occasions for the UE. The communications manager 1120 may be configured as or otherwise support a means for determining a frequency hopping configuration for DCI over a set of symbols of the one or more downlink shared channel occasions based on the control message. The communications manager 1120 may be configured as or otherwise support a means for transmitting DCI using the set of symbols of the one or more downlink shared channel occasions in accordance with the frequency hopping configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for) may support techniques for reducing power consumption and increasing overall signal reliability by activating frequency hopping for DCI transmitted over PDSCH. The device 1105 may therefore adapt to suboptimal signal conditions (e.g., interference, deep fading, etc.) by utilizing an increased beamforming gain associated with PDSCH transmissions and frequency diversity associated with frequency hopping. Further, reducing signaling overhead by transmitting DCI over PDSCH may provide efficient utilization of communication resources.

Figure 12:
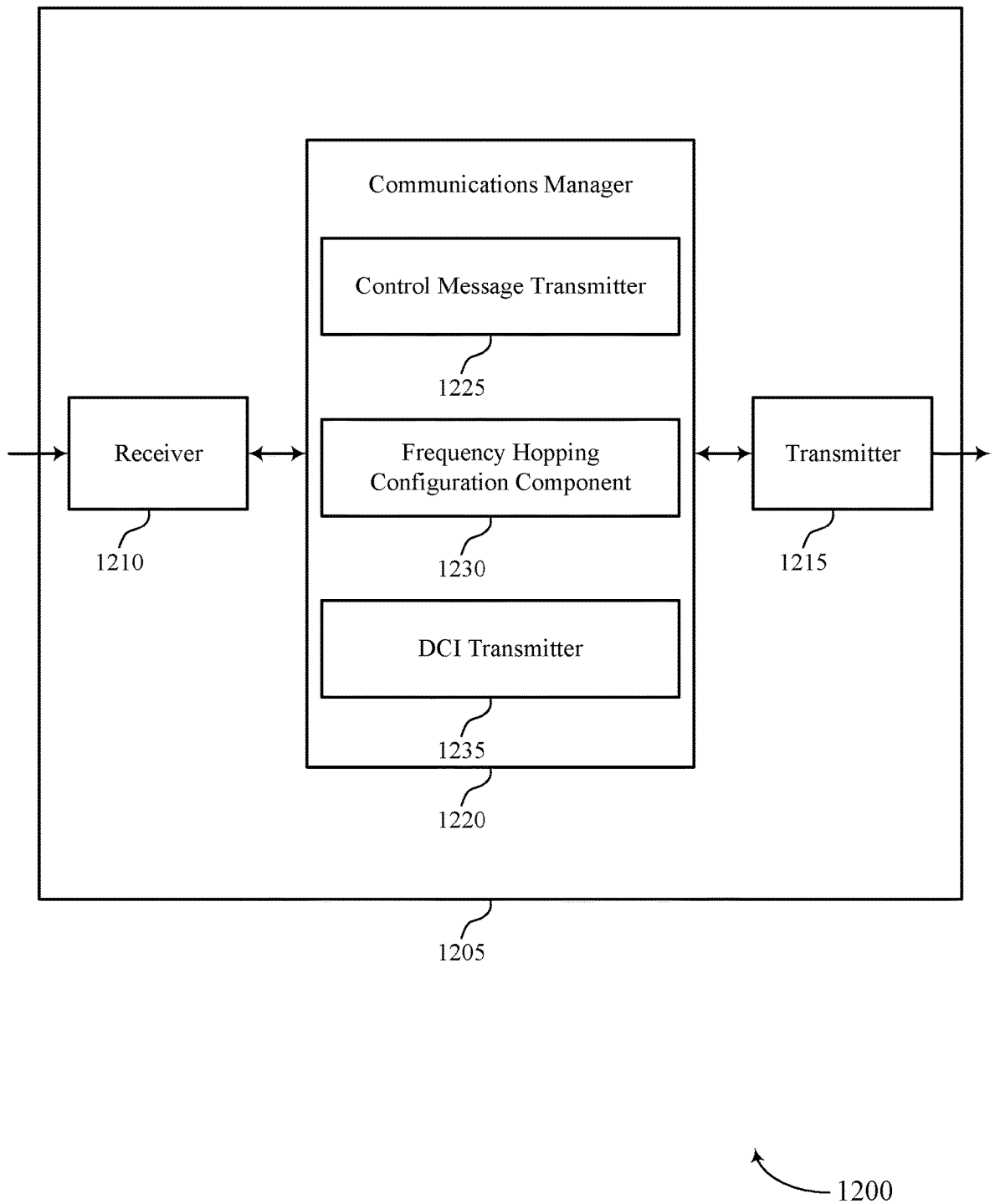

FIG. 12 shows a block diagram 1200 of a device 1205 that supports frequency hopping for control information in downlink shared channel in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to frequency hopping for control information in downlink shared channel). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to frequency hopping for control information in downlink shared channel). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of frequency hopping for control information in downlink shared channel as described herein. For example, the communications manager 1220 may include a control message transmitter 1225, a frequency hopping configuration component 1230, a DCI transmitter 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The control message transmitter 1225 may be configured as or otherwise support a means for transmitting, to a UE, a control message that indicates frequency hopping is activated for DCI in one or more downlink shared channel occasions for the UE. The frequency hopping configuration component 1230 may be configured as or otherwise support a means for determining a frequency hopping configuration for DCI over a set of symbols of the one or more downlink shared channel occasions based on the control message. The DCI transmitter 1235 may be configured as or otherwise support a means for transmitting DCI using the set of symbols of the one or more downlink shared channel occasions in accordance with the frequency hopping configuration.

Figure 13:
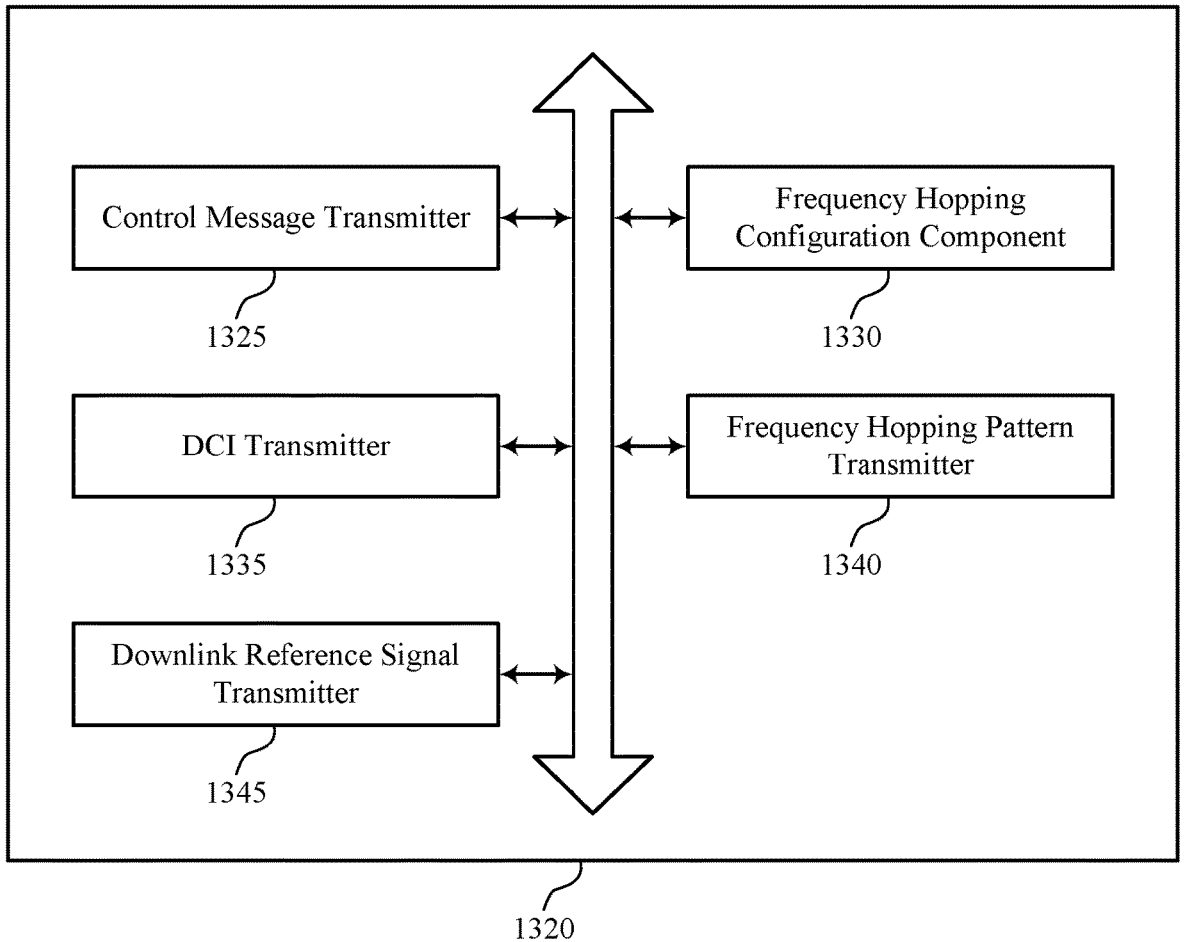
FIG. 13 shows a block diagram of a communications manager that supports frequency hopping for control information in downlink shared channel in accordance with aspects of the present disclosure.

FIG. 13 shows a block diagram 1300 of a communications manager 1320 that supports frequency hopping for control information in downlink shared channel in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of frequency hopping for control information in downlink shared channel as described herein. For example, the communications manager 1320 may include a control message transmitter 1325, a frequency hopping configuration component 1330, a DCI transmitter 1335, a frequency hopping pattern transmitter 1340, a downlink reference signal transmitter 1345, or any combination thereof. Each of these components may communicate, directly or indirectly, with one another (e.g., via one or more buses).

The communications manager 1320 may support wireless communications at a base station in accordance with examples as disclosed herein. The control message transmitter 1325 may be configured as or otherwise support a means for transmitting, to a UE, a control message that indicates frequency hopping is activated for DCI in one or more downlink shared channel occasions for the UE. The frequency hopping configuration component 1330 may be configured as or otherwise support a means for determining a frequency hopping configuration for DCI over a set of symbols of the one or more downlink shared channel occasions based on the control message. The DCI transmitter 1335 may be configured as or otherwise support a means for transmitting DCI using the set of symbols of the one or more downlink shared channel occasions in accordance with the frequency hopping configuration.

In some examples, the control message transmitter 1325 may be configured as or otherwise support a means for transmitting a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

In some examples, the control message transmitter 1325 may be configured as or otherwise support a means for transmitting a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

In some examples, the frequency hopping pattern transmitter 1340 may be configured as or otherwise support a means for transmitting an indication of a frequency hopping pattern of the frequency hopping configuration for the one or more downlink shared channel occasions, the frequency hopping pattern for each of the one or more downlink shared channel occasions or a subset of the one or more downlink shared channel occasions.

In some examples, the frequency hopping pattern indicates a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a BWP allocation of the one or more downlink shared channel occasions.

In some examples, the frequency hopping pattern indicates an index corresponding to a set of starting resource blocks of the set of symbols of the one or more downlink shared channel occasions. In some examples, the frequency hopping pattern indicates a hopping step, a sequence of hopping steps, or a set of frequency locations for the set of symbols of the one or more downlink shared channel occasions.

In some examples, the control message transmitter 1325 may be configured as or otherwise support a means for transmitting a second control message that deactivates frequency hopping for DCI in at least one of the one or more downlink shared channel occasions.

In some examples, the downlink reference signal transmitter 1345 may be configured as or otherwise support a means for transmitting a downlink reference signal in each hop of a set of hops of the DCI over the set of symbols within a downlink shared channel occasion of the one or more downlink shared channel occasions.

In some examples, the downlink reference signal transmitter 1345 may be configured as or otherwise support a means for transmitting a downlink reference signal in each hop of a set of hops of the DCI over the set of symbols across multiple downlink shared channel occasions of the one or more downlink shared channel occasions.

Figure 14:
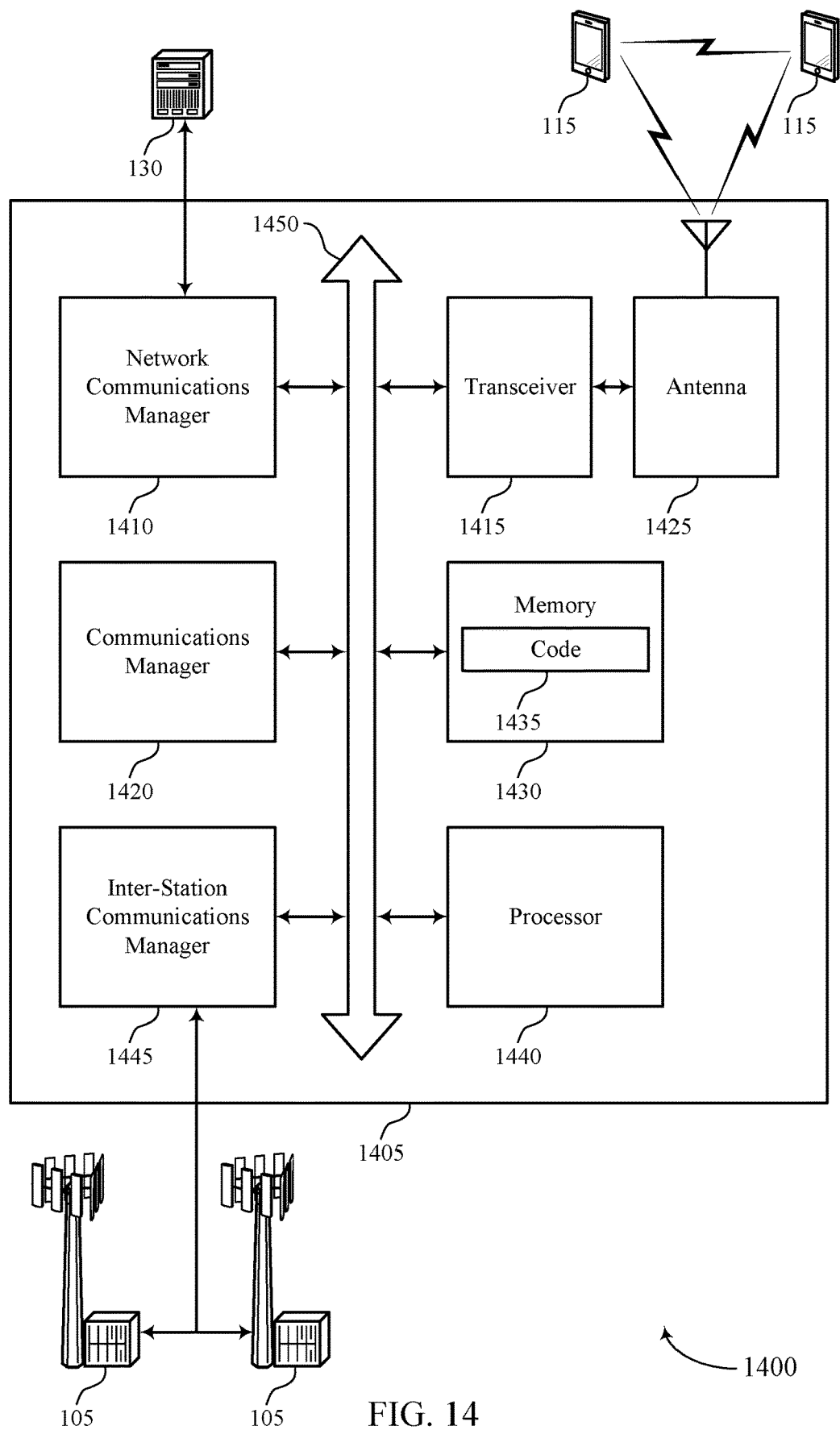
FIG. 14 shows a diagram of a system including a device that supports frequency hopping for control information in downlink shared channel in accordance with aspects of the present disclosure.

FIG. 14 shows a diagram of a system 1400 including a device 1405 that supports frequency hopping for control information in downlink shared channel in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting frequency hopping for control information in downlink shared channel). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, a control message that indicates frequency hopping is activated for DCI in one or more downlink shared channel occasions for the UE. The communications manager 1420 may be configured as or otherwise support a means for determining a frequency hopping configuration for DCI over a set of symbols of the one or more downlink shared channel occasions based on the control message. The communications manager 1420 may be configured as or otherwise support a means for transmitting DCI using the set of symbols of the one or more downlink shared channel occasions in accordance with the frequency hopping configuration.

By including or configuring the communications manager 1420 in accordance with examples as described herein, the device 1405 may support techniques for increasing overall signal reliability by activating frequency hopping for DCI transmitted over PDSCH. For example, increased frequency diversity associated with frequency hopping may increase communications reliability, e.g., while some of the frequencies may suffer suboptimal signal conditions (e.g., interference, deep fading, etc.), others may not. Additionally, higher beamforming gains associated with PDSCH transmissions may further increase robustness. Increasing communications reliability may thereby result in more efficient utilization of communication resources and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of frequency hopping for control information in downlink shared channel as described herein, or the processor 1440 and the memory 1430 may be otherwise configured to perform or support such operations.

Figure 15:
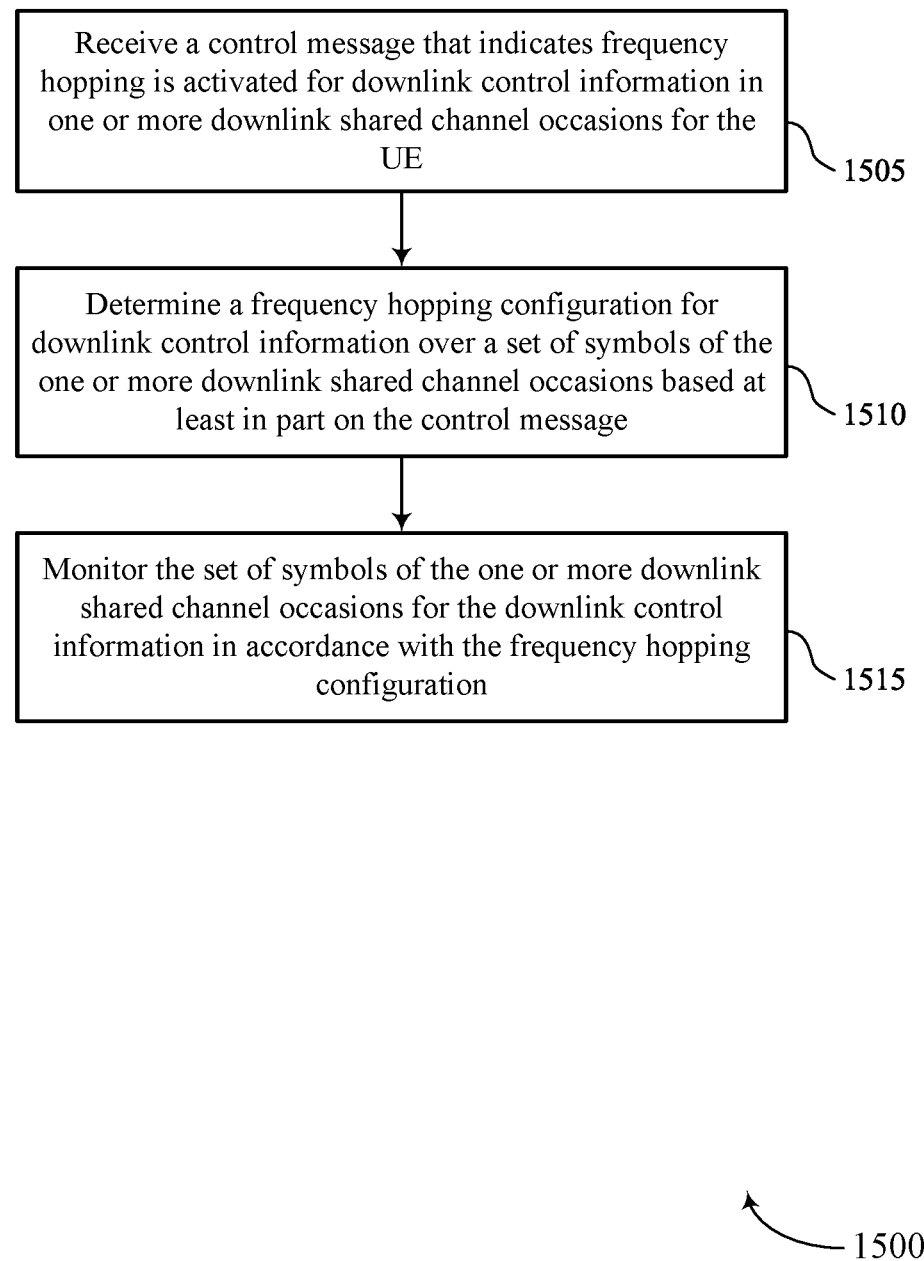
FIGS. 15 through 18 show flowcharts illustrating methods that support frequency hopping for control information in downlink shared channel in accordance with aspects of the present disclosure.

FIG. 15 shows a flowchart illustrating a method 1500 that supports frequency hopping for control information in downlink shared channel in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a control message that indicates frequency hopping is activated for DCI in one or more downlink shared channel occasions for the UE. The operations of 1505 may be performed in accordance with examples as disclosed herein. In some examples, aspects of the operations of 1505 may be performed by a control message receiver 925 as described with reference to FIG. 9.

At 1510, the method may include determining a frequency hopping configuration for DCI over a set of symbols of the one or more downlink shared channel occasions based on the control message. The operations of 1510 may be performed in accordance with examples as disclosed herein. In some examples, aspects of the operations of 1510 may be performed by a frequency hopping configuration component 930 as described with reference to FIG. 9.

At 1515, the method may include monitoring the set of symbols of the one or more downlink shared channel occasions for the DCI in accordance with the frequency hopping configuration. The operations of 1515 may be performed in accordance with examples as disclosed herein. In some examples, aspects of the operations of 1515 may be performed by a monitoring component 935 as described with reference to FIG. 9.

Figure 16:
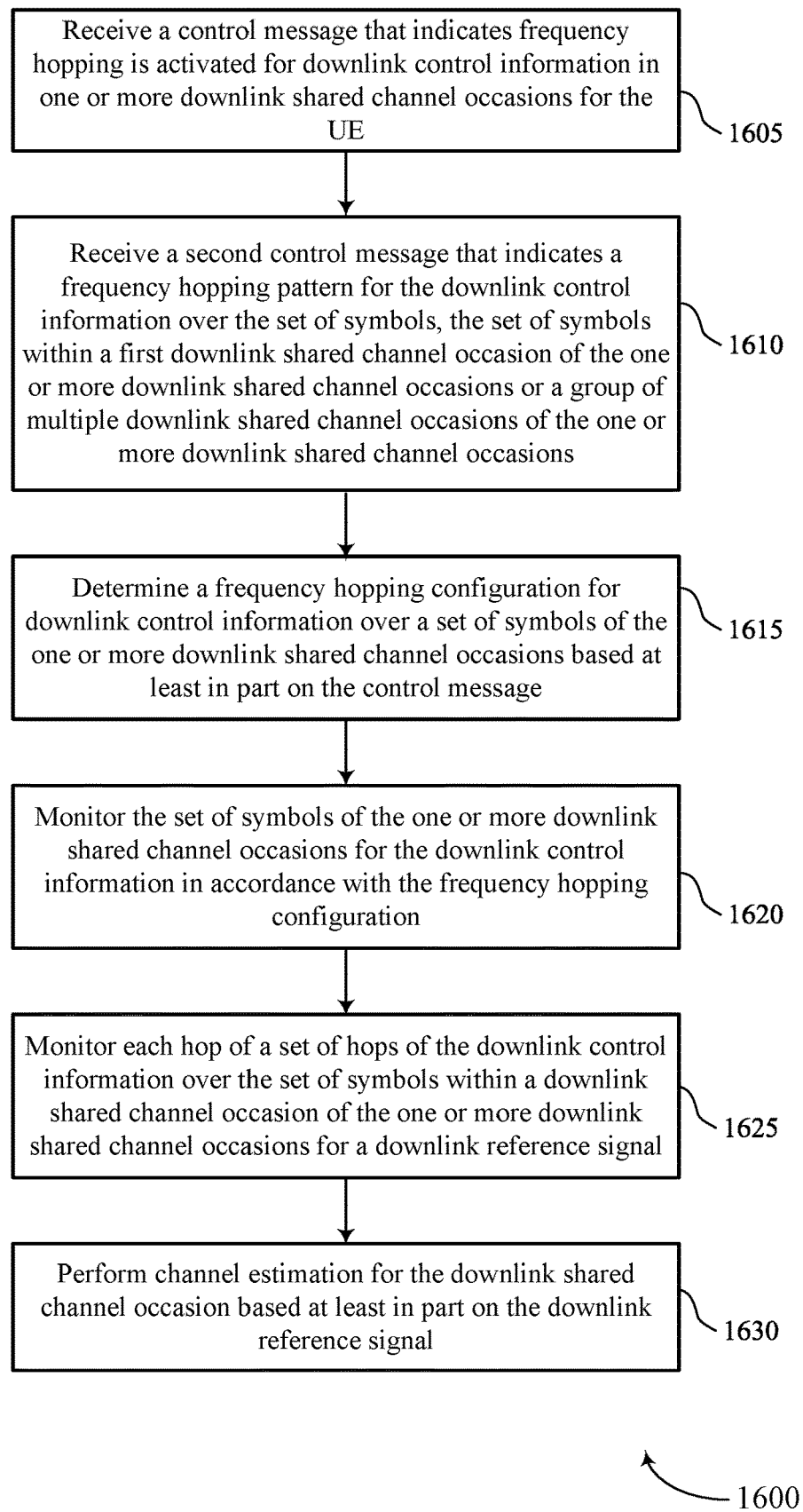

FIG. 16 shows a flowchart illustrating a method 1600 that supports frequency hopping for control information in downlink shared channel in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a control message that indicates frequency hopping is activated for DCI in one or more downlink shared channel occasions for the UE. The operations of 1605 may be performed in accordance with examples as disclosed herein. In some examples, aspects of the operations of 1605 may be performed by a control message receiver 925 as described with reference to FIG. 9.

At 1610, the method may include receiving a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions. The operations of 1610 may be performed in accordance with examples as disclosed herein. In some examples, aspects of the operations of 1610 may be performed by a control message receiver 925 as described with reference to FIG. 9.

At 1615, the method may include determining a frequency hopping configuration for DCI over a set of symbols of the one or more downlink shared channel occasions based on the control message. The operations of 1615 may be performed in accordance with examples as disclosed herein. In some examples, aspects of the operations of 1615 may be performed by a frequency hopping configuration component 930 as described with reference to FIG. 9.

At 1620, the method may include monitoring the set of symbols of the one or more downlink shared channel occasions for the DCI in accordance with the frequency hopping configuration. The operations of 1620 may be performed in accordance with examples as disclosed herein. In some examples, aspects of the operations of 1620 may be performed by a monitoring component 935 as described with reference to FIG. 9.

At 1625, the method may include monitoring each hop of a set of hops of the DCI over the set of symbols within a downlink shared channel occasion of the one or more downlink shared channel occasions for a downlink reference signal. Alternatively, the method may include monitoring some hops if DMRS is not present in each hop of the set of hops. The operations of 1625 may be performed in accordance with examples as disclosed herein. In some examples, aspects of the operations of 1625 may be performed by a monitoring component 935 as described with reference to FIG. 9.

At 1630, the method may include performing channel estimation for the downlink shared channel occasion based on the downlink reference signal. The operations of 1630 may be performed in accordance with examples as disclosed herein. In some examples, aspects of the operations of 1630 may be performed by a channel estimation component 950 as described with reference to FIG. 9.

Figure 17:
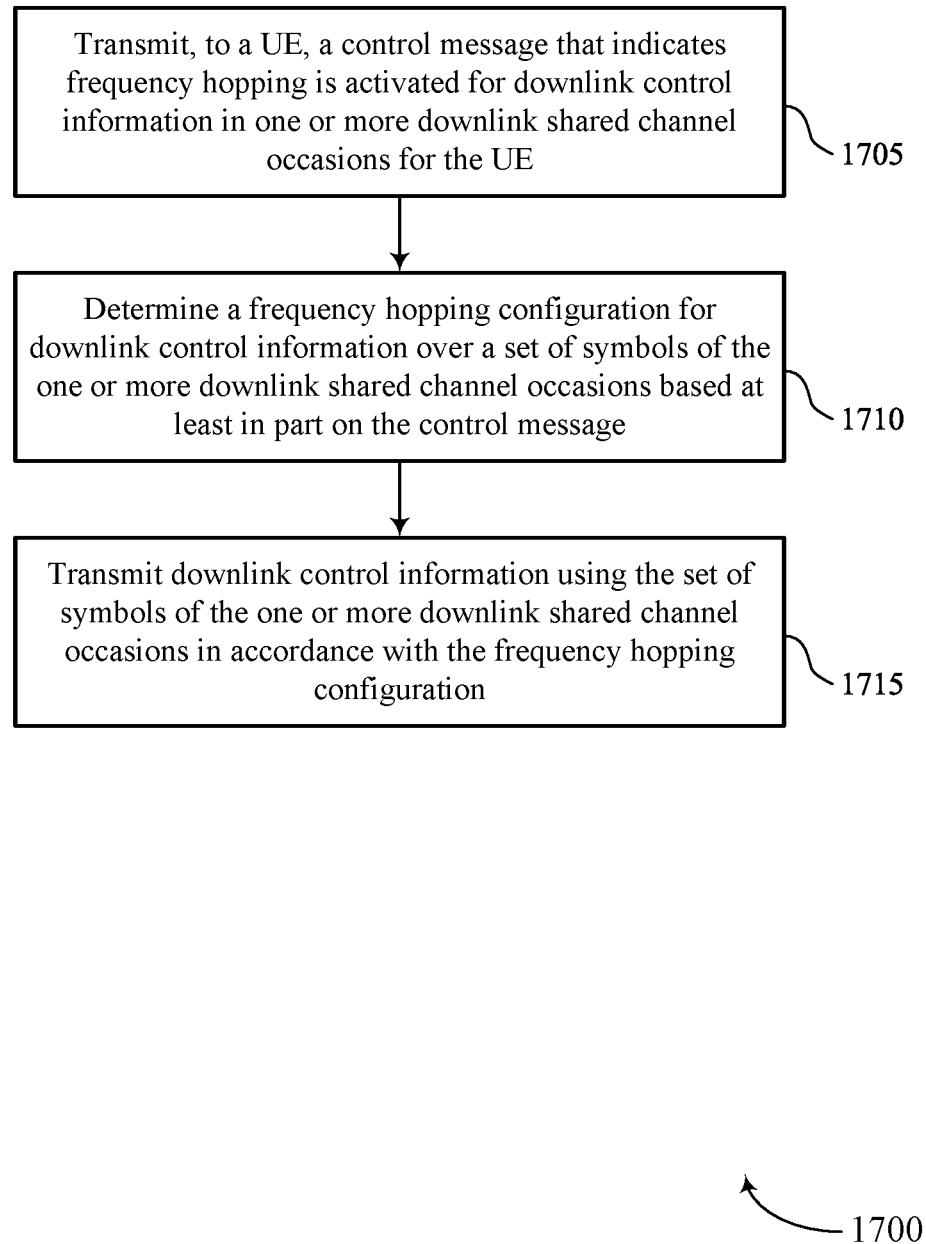

FIG. 17 shows a flowchart illustrating a method 1700 that supports frequency hopping for control information in downlink shared channel in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a control message that indicates frequency hopping is activated for DCI in one or more downlink shared channel occasions for the UE. The operations of 1705 may be performed in accordance with examples as disclosed herein. In some examples, aspects of the operations of 1705 may be performed by a control message transmitter 1325 as described with reference to FIG. 13.

At 1710, the method may include determining a frequency hopping configuration for DCI over a set of symbols of the one or more downlink shared channel occasions based on the control message. The operations of 1710 may be performed in accordance with examples as disclosed herein. In some examples, aspects of the operations of 1710 may be performed by a frequency hopping configuration component 1330 as described with reference to FIG. 13.

At 1715, the method may include transmitting DCI using the set of symbols of the one or more downlink shared channel occasions in accordance with the frequency hopping configuration. The operations of 1715 may be performed in accordance with examples as disclosed herein. In some examples, aspects of the operations of 1715 may be performed by a DCI transmitter 1335 as described with reference to FIG. 13.

Figure 18:
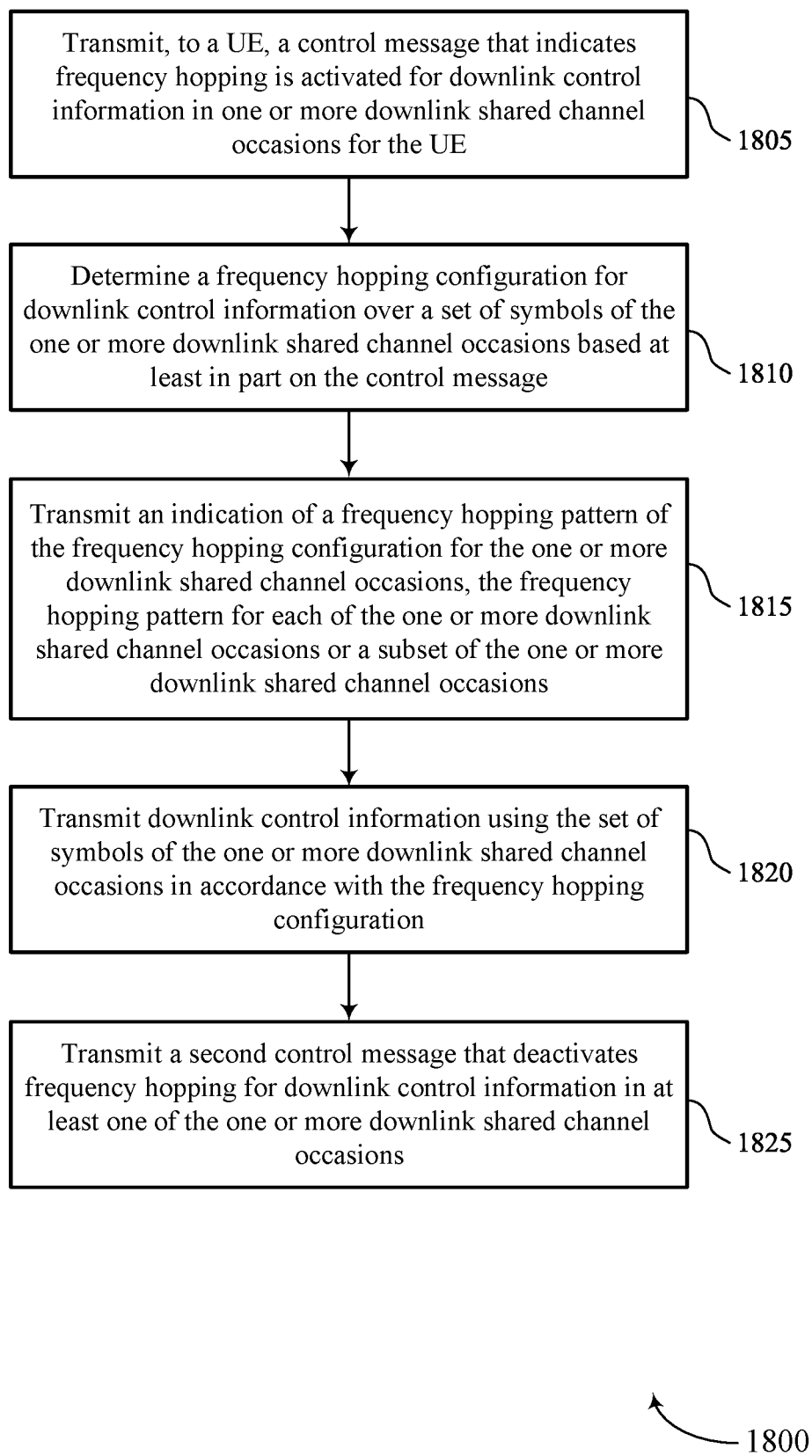

FIG. 18 shows a flowchart illustrating a method 1800 that supports frequency hopping for control information in downlink shared channel in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a control message that indicates frequency hopping is activated for DCI in one or more downlink shared channel occasions for the UE. The operations of 1805 may be performed in accordance with examples as disclosed herein. In some examples, aspects of the operations of 1805 may be performed by a control message transmitter 1325 as described with reference to FIG. 13.

At 1810, the method may include determining a frequency hopping configuration for DCI over a set of symbols of the one or more downlink shared channel occasions based on the control message. The operations of 1810 may be performed in accordance with examples as disclosed herein. In some examples, aspects of the operations of 1810 may be performed by a frequency hopping configuration component 1330 as described with reference to FIG. 13.

At 1815, the method may include transmitting an indication of a frequency hopping pattern of the frequency hopping configuration for the one or more downlink shared channel occasions, the frequency hopping pattern for each of the one or more downlink shared channel occasions or a subset of the one or more downlink shared channel occasions. The operations of 1815 may be performed in accordance with examples as disclosed herein. In some examples, aspects of the operations of 1815 may be performed by a frequency hopping pattern transmitter 1340 as described with reference to FIG. 13.

At 1820, the method may include transmitting DCI using the set of symbols of the one or more downlink shared channel occasions in accordance with the frequency hopping configuration. The operations of 1820 may be performed in accordance with examples as disclosed herein. In some examples, aspects of the operations of 1820 may be performed by a DCI transmitter 1335 as described with reference to FIG. 13.

At 1825, the method may include transmitting a second control message that deactivates frequency hopping for DCI in at least one of the one or more downlink shared channel occasions. The operations of 1825 may be performed in accordance with examples as disclosed herein. In some examples, aspects of the operations of 1825 may be performed by a control message transmitter 1325 as described with reference to FIG. 13.

The following provides an overview of aspects of the present disclosure:

Aspect 1: A method for wireless communications at a UE, comprising: receiving a control message that indicates frequency hopping is activated for DCI in one or more downlink shared channel occasions for the UE; determining a frequency hopping configuration for DCI over a set of symbols of the one or more downlink shared channel occasions based at least in part on the control message; and monitoring the set of symbols of the one or more downlink shared channel occasions for the DCI in accordance with the frequency hopping configuration.

Aspect 2: The method of aspect 1, wherein determining the frequency hopping configuration comprises: determining a frequency hopping pattern for the DCI over the set of symbols within a single downlink shared channel occasion.

Aspect 3: The method of any of aspects 1 through 2, further comprising: receiving a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

Aspect 4: The method of aspect 3, further comprising: receiving a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

Aspect 5: The method of any of aspects 1 through 4, further comprising: determining a respective time duration for each hop of a set of frequency hops indicated by the frequency hopping configuration, the respective time durations based at least in part on a length of the DCI.

Aspect 6: The method of any of aspects 1 through 5, further comprising: determining a number of frequency locations across multiple downlink shared channel occasions of the one or more downlink shared channel occasions indicated by the frequency hopping configuration, wherein the set of symbols span the number of frequency locations.

Aspect 7: The method of any of aspects 1 through 6, further comprising: receiving, from a base station, an indication of a frequency hopping pattern of the frequency hopping configuration for the one or more downlink shared channel occasions, the frequency hopping pattern for each of the one or more downlink shared channel occasions or a subset of the one or more downlink shared channel occasions.

Aspect 8: The method of any of aspects 1 through 7, further comprising: receiving, from a base station, an indication of a frequency hopping pattern of the frequency hopping configuration for the one or more downlink shared channel occasions; and determining, based at least in part on the frequency hopping pattern, a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a BWP allocation of the one or more downlink shared channel occasions, wherein the monitoring is based at least in part on the sequence of offsets.

Aspect 9: The method of any of aspects 1 through 8, further comprising: receiving, from a base station, an indication of a frequency hopping pattern of the frequency hopping configuration for the one or more downlink shared channel occasions; and determining, based at least in part on the frequency hopping pattern, an index corresponding to a set of starting resource blocks of the set of symbols of the one or more downlink shared channel occasions, wherein the monitoring is based at least in part on the set of starting resource blocks.

Aspect 10: The method of any of aspects 1 through 9, further comprising: receiving, from a base station, an indication of a frequency hopping pattern of the frequency hopping configuration for the one or more downlink shared channel occasions; and determining, based at least in part on the frequency hopping pattern, a hopping step, a sequence of hopping steps, or a set of frequency locations for the set of symbols of the one or more downlink shared channel occasions, wherein the monitoring is based at least in part on the hopping step, the sequence of hopping steps, or the set of frequency locations.

Aspect 11: The method of aspect 10, wherein the set of frequency locations is based at least in part on a resource index of a synchronization signal of a reference signal associated with the one or more downlink shared channel occasions, or a system frame number associated with at least one of the one or more downlink shared channel occasions.

Aspect 12: The method of any of aspects 1 through 11, further comprising: monitoring each hop of a set of hops of the DCI over the set of symbols within a downlink shared channel occasion of the one or more downlink shared channel occasions for a downlink reference signal; and performing channel estimation for the downlink shared channel occasion based at least in part on the downlink reference signal.

Aspect 13: The method of any of aspects 1 through 12, further comprising: monitoring each hop of a set of hops of the DCI over the set of symbols across multiple downlink shared channel occasions of the one or more downlink shared channel occasions for one or more downlink reference signals; and performing channel estimation for the multiple downlink shared channel occasions based at least in part on the one or more downlink reference signals.

Aspect 14: The method of any of aspects 1 through 13, further comprising: receiving a second control message that deactivates frequency hopping for DCI in at least one of the one or more downlink shared channel occasions.

Aspect 15: The method of any of aspects 1 through 14, wherein the control message comprises an RRC message, a MAC-CE, or a DCI message.

Aspect 16: The method of any of aspects 1 through 15, wherein the set of symbols is within a same downlink shared channel occasion of the one or more downlink shared channel occasions.

Aspect 17: The method of any of aspects 1 through 16, wherein the set of symbols is within two or more downlink shared channel occasions of the one or more downlink shared channel occasions.

Aspect 18: A method for wireless communications at a base station, comprising: transmitting, to a UE, a control message that indicates frequency hopping is activated for DCI in one or more downlink shared channel occasions for the UE; determining a frequency hopping configuration for DCI over a set of symbols of the one or more downlink shared channel occasions based at least in part on the control message; and transmitting DCI using the set of symbols of the one or more downlink shared channel occasions in accordance with the frequency hopping configuration.

Aspect 19: The method of aspect 18, further comprising: transmitting a second control message that indicates a frequency hopping pattern for the DCI over the set of symbols, the set of symbols within a first downlink shared channel occasion of the one or more downlink shared channel occasions or a group of multiple downlink shared channel occasions of the one or more downlink shared channel occasions.

Aspect 20: The method of aspect 19, further comprising: transmitting a third control message that indicates a change of the frequency hopping pattern for the DCI over the set of symbols within a second downlink shared channel occasion of the one or more downlink shared channel occasions or a second group of multiple downlink shared channel occasions of the one or more downlink shared channel occasions.

Aspect 21: The method of any of aspects 18 through 20, further comprising: transmitting an indication of a frequency hopping pattern of the frequency hopping configuration for the one or more downlink shared channel occasions, the frequency hopping pattern for each of the one or more downlink shared channel occasions or a subset of the one or more downlink shared channel occasions.

Aspect 22: The method of aspect 21, wherein the frequency hopping pattern indicates a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a bandwidth part (BWP) allocation of the one or more downlink shared channel occasions.

Aspect 23: The method of any of aspects 21 through 22, wherein the frequency hopping pattern indicates an index corresponding to a set of starting resource blocks of the set of symbols of the one or more downlink shared channel occasions.

Aspect 24: The method of any of aspects 21 through 23, wherein the frequency hopping pattern indicates a hopping step, a sequence of hopping steps, or a set of frequency locations for the set of symbols of the one or more downlink shared channel occasions.

Aspect 25: The method of any of aspects 18 through 24, further comprising: transmitting a second control message that deactivates frequency hopping for DCI in at least one of the one or more downlink shared channel occasions.

Aspect 26: The method of any of aspects 18 through 25, further comprising: transmitting a downlink reference signal in each hop of a set of hops of the DCI over the set of symbols within a downlink shared channel occasion of the one or more downlink shared channel occasions.

Aspect 27: The method of any of aspects 18 through 26, further comprising: transmitting a downlink reference signal in each hop of a set of hops of the DCI over the set of symbols across multiple downlink shared channel occasions of the one or more downlink shared channel occasions.

Aspect 28: An apparatus for wireless communications at a UE, comprising a processor; memory coupled with the processor; and instructions stored in the memory and executable by the processor to cause the apparatus to perform a method of any of aspects 1 through 17.

Aspect 29: An apparatus for wireless communications at a UE, comprising at least one means for performing a method of any of aspects 1 through 17.

Aspect 30: A non-transitory computer-readable medium storing code for wireless communications at a UE, the code comprising instructions executable by a processor to perform a method of any of aspects 1 through 17.

Aspect 31: An apparatus for wireless communications at a base station, comprising a processor; memory coupled with the processor; and instructions stored in the memory and executable by the processor to cause the apparatus to perform a method of any of aspects 18 through 27.

Aspect 32: An apparatus for wireless communications at a base station, comprising at least one means for performing a method of any of aspects 18 through 27.

Aspect 33: A non-transitory computer-readable medium storing code for wireless communications at a base station, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a control message that activates frequency hopping for downlink control information and that indicates a frequency hopping configuration for the frequency hopping for the downlink control information, the frequency hopping for the downlink control information being for a set of symbols within one or more downlink shared channel occasions for the UE; and
   monitoring the set of symbols of the one or more downlink shared channel occasions and respective frequency resources of each symbol of the one or more downlink shared channel occasions for the downlink control information, the monitoring being in accordance with the frequency hopping configuration for the frequency hopping for the downlink control information within the set of symbols of the one or more downlink shared channel occasions.

2. The method of claim 1, further comprising:
   determining, based at least in part on the frequency hopping configuration, a frequency hopping pattern for the downlink control information over the set of symbols within a single downlink shared channel occasion.

3. The method of claim 1, further comprising:
   receiving a second control message that indicates a frequency hopping pattern for the downlink control information over the set of symbols, the set of symbols within a first downlink shared channel occasion of the one or more downlink shared channel occasions or a group of multiple downlink shared channel occasions of the one or more downlink shared channel occasions.

4. The method of claim 3, further comprising:
   receiving a third control message that indicates a change of the frequency hopping pattern for the downlink control information over the set of symbols within a second downlink shared channel occasion of the one or more downlink shared channel occasions or a second group of multiple downlink shared channel occasions of the one or more downlink shared channel occasions.

5. The method of claim 1, further comprising:
   determining a respective time duration for each hop of a set of frequency hops indicated by the frequency hopping configuration, the respective time durations based at least in part on a length of the downlink control information.

6. The method of claim 1, further comprising:
   determining a number of frequency locations across multiple downlink shared channel occasions of the one or more downlink shared channel occasions indicated by the frequency hopping configuration, wherein the set of symbols span the number of frequency locations.

7. The method of claim 1, further comprising:
   receiving, from a network device, an indication of a frequency hopping pattern of the frequency hopping configuration for the one or more downlink shared channel occasions, the frequency hopping pattern for each of the one or more downlink shared channel occasions or a subset of the one or more downlink shared channel occasions.

8. The method of claim 1, further comprising:
   receiving, from a network device, an indication of a frequency hopping pattern of the frequency hopping configuration for the one or more downlink shared channel occasions; and
   determining, based at least in part on the frequency hopping pattern, a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a bandwidth part (BWP) allocation of the one or more downlink shared channel occasions, wherein the monitoring is based at least in part on the sequence of offsets.

9. The method of claim 1, further comprising:
   receiving, from a network device, an indication of a frequency hopping pattern of the frequency hopping configuration for the one or more downlink shared channel occasions; and
   determining, based at least in part on the frequency hopping pattern, an index corresponding to a set of starting resource blocks of the set of symbols of the one or more downlink shared channel occasions, wherein the monitoring is based at least in part on the set of starting resource blocks.

10. The method of claim 1, further comprising:

receiving, from a network device, an indication of a frequency hopping pattern of the frequency hopping configuration for the one or more downlink shared channel occasions; and determining, based at least in part on the frequency hopping pattern, a hopping step, a sequence of hopping steps, or a set of frequency locations for the set of symbols of the one or more downlink shared channel occasions, wherein the monitoring is based at least in part on the hopping step, the sequence of hopping steps, or the set of frequency locations.

11. The method of claim 10, wherein the set of frequency locations is based at least in part on a resource index of a synchronization signal of a reference signal associated with the one or more downlink shared channel occasions, or a system frame number associated with at least one of the one or more downlink shared channel occasions.

12. The method of claim 1, further comprising:
monitoring each hop of a set of hops of the downlink control information over the set of symbols within a downlink shared channel occasion of the one or more downlink shared channel occasions for a downlink reference signal; and
performing channel estimation for the downlink shared channel occasion based at least in part on the downlink reference signal.

13. The method of claim 1, further comprising:
monitoring each hop of a set of hops of the downlink control information over the set of symbols across multiple downlink shared channel occasions of the one or more downlink shared channel occasions for one or more downlink reference signals; and
performing channel estimation for the multiple downlink shared channel occasions based at least in part on the one or more downlink reference signals.

14. The method of claim 1, further comprising:
receiving a second control message that deactivates frequency hopping for the downlink control information in at least one of the one or more downlink shared channel occasions.

15. The method of claim 1, wherein the control message comprises a radio resource control (RRC) message, a medium access control (MAC) control element (MAC-CE), or a downlink control information (DCI) message.

16. The method of claim 1, wherein the set of symbols is within a same downlink shared channel occasion of the one or more downlink shared channel occasions.

17. The method of claim 1, wherein the set of symbols is within two or more downlink shared channel occasions of the one or more downlink shared channel occasions.

18. A method for wireless communications at a network device, comprising:
transmitting, to a user equipment (UE), a control message that activates frequency hopping for downlink control information and that indicates a frequency hopping configuration for the frequency hopping for the downlink control information, the frequency hopping for the downlink control information being for a set of symbols within one or more downlink shared channel occasions for the UE; and
transmitting the downlink control information using the set of symbols of the one or more downlink shared channel occasions and respective frequency resources of each symbol of the one or more downlink shared channel occasions, the transmitting being in accordance with the frequency hopping configuration for the downlink control information within the set of symbols of the one or more downlink shared channel occasions.

19. The method of claim 18, further comprising:
transmitting a second control message that indicates a frequency hopping pattern for the downlink control information over the set of symbols, the set of symbols within a first downlink shared channel occasion of the one or more downlink shared channel occasions or a group of multiple downlink shared channel occasions of the one or more downlink shared channel occasions.

20. The method of claim 19, further comprising:
transmitting a third control message that indicates a change of the frequency hopping pattern for the downlink control information over the set of symbols within a second downlink shared channel occasion of the one or more downlink shared channel occasions or a second group of multiple downlink shared channel occasions of the one or more downlink shared channel occasions.

21. The method of claim 18, further comprising:
transmitting an indication of a frequency hopping pattern of the frequency hopping configuration for the one or more downlink shared channel occasions, the frequency hopping pattern for each of the one or more downlink shared channel occasions or a subset of the one or more downlink shared channel occasions.

22. The method of claim 21, wherein the frequency hopping pattern indicates a sequence of offsets for a set of starting resource blocks of the set of symbols of the one or more downlink shared channel occasions, the sequence of offsets relative to a frequency allocation of a respective shared channel occasion of the one or more downlink shared channel occasions or relative to a bandwidth part (BWP) allocation of the one or more downlink shared channel occasions.

23. The method of claim 21, wherein the frequency hopping pattern indicates an index corresponding to a set of starting resource blocks of the set of symbols of the one or more downlink shared channel occasions.

24. The method of claim 21, wherein the frequency hopping pattern indicates a hopping step, a sequence of hopping steps, or a set of frequency locations for the set of symbols of the one or more downlink shared channel occasions.

25. The method of claim 18, further comprising:
transmitting a second control message that deactivates frequency hopping for the downlink control information in at least one of the one or more downlink shared channel occasions.

26. The method of claim 18, further comprising:
transmitting a downlink reference signal in each hop of a set of hops of the downlink control information over the set of symbols within a downlink shared channel occasion of the one or more downlink shared channel occasions.

27. The method of claim 18, further comprising:
transmitting a downlink reference signal in each hop of a set of hops of the downlink control information over the set of symbols across multiple downlink shared channel occasions of the one or more downlink shared channel occasions.

28. An apparatus for wireless communications at a user equipment (UE), comprising:
a processor;
memory coupled with the processor; and
instructions stored in the memory and executable by the processor to cause the apparatus to:

receive a control message that activates frequency hopping is for downlink control information and that indicates a frequency hopping configuration for the frequency hopping for the downlink control information, the frequency hopping for the downlink control information being for a set of symbols within one or more downlink shared channel occasions for the UE; and monitor the set of symbols of the one or more downlink shared channel occasions and respective frequency resources of each symbol of the one or more downlink shared channel occasions for the downlink control information, the monitoring being in accordance with the frequency hopping configuration for the frequency hopping for the downlink control information within the set of symbols of the one or more downlink shared channel occasions.

29. The apparatus of claim 28, wherein the instructions are further executable by the processor to cause the apparatus to:

determine, based at least in part on the frequency hopping configuration, a frequency hopping pattern for the downlink control information over the set of symbols within a single downlink shared channel occasion.

30. An apparatus for wireless communications at a network device, comprising:

a processor;

memory coupled with the processor; and instructions stored in the memory and executable by the processor to cause the apparatus to:

transmit, to a user equipment (UE), a control message that activates frequency hopping for downlink control information and that indicates a frequency hopping configuration for the frequency hopping for the downlink control information, the frequency hopping for the downlink control information being for a set of symbols within one or more downlink shared channel occasions for the UE; and transmit the downlink control information using the set of symbols of the one or more downlink shared channel occasions and respective frequency resources of each symbol of the one or more downlink shared channel occasions, the transmitting being in accordance with the frequency hopping configuration for the downlink control information within the set of symbols of the one or more downlink shared channel occasions.

* * * * *